United States Patent [19]
Ishizu et al.

[11] Patent Number: 6,021,258
[45] Date of Patent: Feb. 1, 2000

[54] ELECTRONIC APPARATUS, IMAGE PROCESS APPARATUS, IMAGE PROCESS METHOD AND STORAGE MEDIUM

[75] Inventors: Masanori Ishizu, Yokohama; Kenichi Kobayashi, Kashiwa; Yasuko Shibahara, Inagi, all of Japan

[73] Assignee: Canon Kabushiki Kaisha, Tokyo, Japan

[21] Appl. No.: 08/881,664

[22] Filed: Jun. 24, 1997

[30] Foreign Application Priority Data

Jun. 27, 1996 [JP] Japan .................................. 8-167861
Feb. 28, 1997 [JP] Japan .................................. 9-45666

[51] Int. Cl.⁷ .............................. G06K 15/14; H04N 1/50
[52] U.S. Cl. .......................... 395/109; 358/504; 358/501; 358/540
[58] Field of Search .................................. 395/114, 109; 358/540, 504, 501, 409, 300; 347/115, 116, 232, 248, 250

[56] References Cited

U.S. PATENT DOCUMENTS 5,126,756  6/1992  Ban .......................................... 347/232
5,430,554  7/1995  Konakai ................................ 358/409
5,781,310  7/1998  Nakamura et al. ...................... 358/409
5,887,125  3/1999  Takano et al. .......................... 358/540

*Primary Examiner*—Scott Rogers
*Attorney, Agent, or Firm*—Fitzpatrick, Cella, Harper & Scinto

[57] ABSTRACT

In a case of forming a color image by superimposing a plurality of colors of plane images, the plurality of colors of plane images are superimposed such that positions of these images are not displaced or aberrated irrespective of influence by a change in time, thereby resultingly forming a high-quality color image. Especially, in consideration of image data supplying from an external apparatus, the load on an image formation apparatus is reduced. In order to achieve such effects, there is provided an electronic apparatus comprising a transmission means for transmitting, to the external apparatus which visibly outputs the color image by superimposing the plurality of colors of plane images, image data corresponding to the plurality of colors of plane images, a reception means for receiving information representing extent of a positional displacement occurring in superimposing the plurality of colors of plane images in the external apparatus, and a control means for controlling timing of the transmitting of the image data corresponding to the plurality of colors of plane images by the transmission means, on the basis of the information received by the reception means.

17 Claims, 17 Drawing Sheets

FIG. 4

COLOR DISPLACEMENT
NOTIFICATION COMMAND IN M
SUB-SCAN DIRECTION : F1 (H)

| | |
|---|---|
| 1ST BIT | 1 |
| 2ND BIT | 1 |
| 3RD BIT | 1 |
| 4TH BIT | 1 |
| 5TH BIT | 0 |
| 6TH BIT | 0 |
| 7TH BIT | 0 |
| 8TH BIT | 1 (ODD-NUMBER PARITY) |

STATUS

| | |
|---|---|
| 1ST BIT | ERROR BIT |
| 2ND BIT | CODE BIT |
| 3RD BIT | DATA (MSB) |
| 4TH BIT | : |
| 5TH BIT | : |
| 6TH BIT | : |
| 7TH BIT | (LSB) |
| 8TH BIT | ODD-NUMBER PARITY BIT |

COLOR DISPLACEMENT
NOTIFICATION COMMAND IN C
SUB-SCAN DIRECTION : F2 (H)

| | |
|---|---|
| 1ST BIT | 1 |
| 2ND BIT | 1 |
| 3RD BIT | 1 |
| 4TH BIT | 1 |
| 5TH BIT | 0 |
| 6TH BIT | 0 |
| 7TH BIT | 1 |
| 8TH BIT | 0 (ODD-NUMBER PARITY) |

STATUS

| | |
|---|---|
| 1ST BIT | ERROR BIT |
| 2ND BIT | CODE BIT |
| 3RD BIT | DATA (MSB) |
| 4TH BIT | : |
| 5TH BIT | : |
| 6TH BIT | : |
| 7TH BIT | (LSB) |
| 8TH BIT | ODD-NUMBER PARITY BIT |

FIG. 5

COLOR DISPLACEMENT
NOTIFICATION COMMAND IN Y
SUB-SCAN DIRECTION : F4 (H)

| 1ST BIT | 1 |
|---|---|
| 2ND BIT | 1 |
| 3RD BIT | 1 |
| 4TH BIT | 1 |
| 5TH BIT | 0 |
| 6TH BIT | 1 |
| 7TH BIT | 0 |
| 8TH BIT | 0 (ODD-NUMBER PARITY) |

STATUS

| 1ST BIT | ERROR BIT |
|---|---|
| 2ND BIT | CODE BIT |
| 3RD BIT | DATA (MSB) |
| 4TH BIT | |
| 5TH BIT | |
| 6TH BIT | |
| 7TH BIT | (LSB) |
| 8TH BIT | ODD-NUMBER PARITY BIT |

COLOR DISPLACEMENT
NOTIFICATION COMMAND IN Bk
SUB-SCAN DIRECTION : F7 (H)

| 1ST BIT | 1 |
|---|---|
| 2ND BIT | 1 |
| 3RD BIT | 1 |
| 4TH BIT | 1 |
| 5TH BIT | 0 |
| 6TH BIT | 1 |
| 7TH BIT | 1 |
| 8TH BIT | 1 (ODD-NUMBER PARITY) |

STATUS

| 1ST BIT | ERROR BIT |
|---|---|
| 2ND BIT | CODE BIT |
| 3RD BIT | DATA (MSB) |
| 4TH BIT | |
| 5TH BIT | |
| 6TH BIT | |
| 7TH BIT | (LSB) |
| 8TH BIT | ODD-NUMBER PARITY BIT |

FIG. 17A
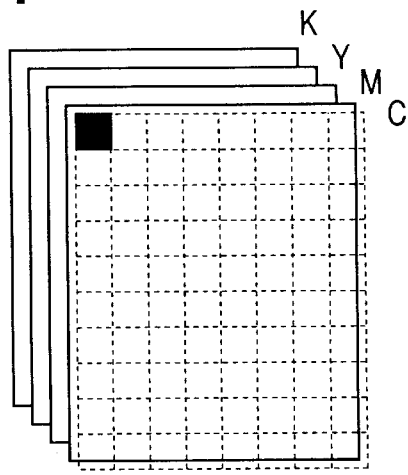
FOR EXAMPLE, IN CASE OF DETECTING THAT CYAN PLANE IS DISPLACED IN MAIN-SCAN DIRECTION BY 1 DOT, AND IN SUB-SCAN DIRECTION BY 2 DOTS
FIG. 17B
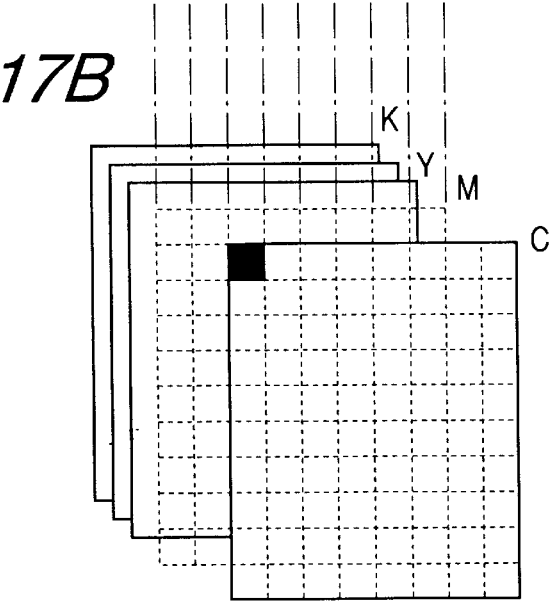
DATA DISPLACEMENT IN FIG. 17A CAN BE CORRECTED BY PREVIOUSLY DISPLACING CYAN PLANE IN MAIN-SCAN DIRECTION BY 1 DOT, AND IN SUB-SCAN DIRECTION BY 2 DOTS, AND BY MANAGING IT AS DATA IN FIG. 17B
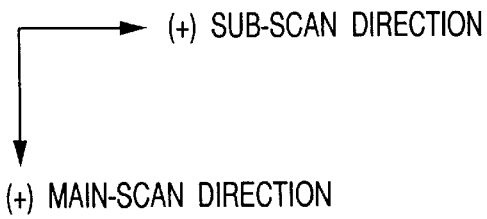
(+) SUB-SCAN DIRECTION
(+) MAIN-SCAN DIRECTION

MONITOR OF COMPUTER 1000

| | DISPLACEMENT AMOUNT | |
|---|---|---|
| | MAIN-SCAN DIRECTION | SUB-SCAN DIRECTION |
| C | 0 pixel | -2 pixel |
| M | 0 pixel | -1 pixel |
| Y | 0 pixel | 0 pixel |
| Bk | 0 pixel | 1 pixel |

MONITOR OF COMPUTER 1000

ELECTRONIC APPARATUS, IMAGE PROCESS APPARATUS, IMAGE PROCESS METHOD AND STORAGE MEDIUM

BACKGROUND OF THE INVENTION

1. Field of the Invention

The present invention relates to a technique for forming, in a case of forming a color image by superimposing a plurality of colors of plane images, a high-precision color image without any positional displacement or aberration of each plane image.

2. Related Background Art

FIG. 10 is a schematic sectional view for explaining structure of a conventional image formation apparatus, and also showing a color laser beam printer which is obtained by applying an electrophotographic technique to a printer.

Hereinafter, the structure and operation of such image formation apparatus will be explained.

An image signal which has been sent from an external host computer 1000 and described in a predetermined description system is inputted into a controller unit 14 of the printer, and converted into a signal capable of being printed. After then, the converted signal is inputted into a laser driver 61 through a CPU (central processing unit) 60. The laser driver 61 modulates light generation intensity of a laser beam and outputs the modulated beam on the basis of the converted signal. An optical path of the laser beam is adjusted by a reflection mirror 62, whereby the beam is irradiated onto a photosensitive drum 12 to form a latent image thereon. In the latent image formed on the photosensitive drum 12, on a portion at which the laser beam has been irradiated, an image selectively appears by voltage applied to development sleeves of development units 64a to 64d and an electric field formed responsive to surface potential on the photosensitive drum 12. Density of the image is substantially determined by field intensity of such electric field and toner amounts of the development sleeves. Reference numeral 63 denotes a charger which uniformly charges the photosensitive drum 12.

The image appeared on the photosensitive drum 12 is once transferred to an intermediate transfer belt (to be referred as ITB hereinafter) 73 by a primary transfer roller 75, to form a reversed image. By repeating such an operation for yellow (to be referred as Y hereinafter), magenta (to be referred as M hereinafter), cyan (to be referred as C hereinafter) and black (to be referred as Bk hereinafter), a reversed full-color image is formed on the ITB 73. In this operation, the ITB 73 is driven by rollers 74 to 76 and 78.

A transfer member put in a cassette 65 is picked up one by one by a paper feed roller 66, and writing timing is adjusted by resist rollers 67. Then, the full-color image which consists of Y, M, C and Bk and has been formed on the ITB 73 is transferred to the transfer member by secondary transfer rollers 77.

Then the transfer member fed to a carrying belt 68 is sent to a fixing roller 69 and a pressing roller 70. By fixing the toner onto the transfer member with the fixing roller 69 and the pressing roller 70, a permanent fixed image is formed on the transfer member, and this transfer member is stacked up on a tray 71. In this operation, the controller unit 14 divides the image signal into process colors (ordinarily Y, M, C and Bk) which are managed by the printer, and sends a drawing signal based on each toner to the laser driver 61. A color reproduction range (or gamut) is determined based on density of each toner and an overlapping manner of the toners.

Further, in order to control positional displacement (or aberration) among the colors, various methods have been attempted to prevent a drawback such as teeth blowing of a driving gear or the like by increasing fixing intensity of the photosensitive drum 12 and the ITB 73 and by attaching a fly wheel (not shown) to the photosensitive drum 12.

As a method of controlling the density of each-color toner, there has been provided a method in which an optical sensor 11 constituting of a light emission element such as a light emission diode (LED) or the like and a light reception element such as a photodiode (CdS) or the like is provided to measure or detect the density of the toner transferred onto the photosensitive drum 12, and a measured value is transferred to the controller unit 14 to control development bias, thereby suppressing dispersion in the density due to a change in circumstances or the like. Further, there has been provided a method in which the optical sensor 11 is mounted on the ITB 73 to control the density.

However, in the image formation apparatus having this conventional structure, several problems have occurred. That is, in the conventional apparatus, it has been necessary to apply the fly wheel, to increase accuracy in individual parts, and the like, in order to reduce color displacement (or aberration) by achieving rigidity reinforcement of the apparatus, thereby increasing manufacturing cost, decreasing throughput, and the like. In addition, there has been a further problem that, even in the apparatus of which color displacement level is low in its initial use state, the color displacement increases due to the change in circumstances, endurance and the like a long period of use.

In any case, a main object of the above-described color printer or the like is to print a color image which has been transmitted from an electronic apparatus such as a personal computer or the like. However, in recent years, a function of the electronic apparatus has increased, as a function of the CPU has increased, whereby it becomes possible to cause the electronic apparatus to execute the function of the color printer instead of such the printer. Also, in recent years, communication speed between the apparatuses has increased, whereby it becomes possible to communicate image data at high speed.

SUMMARY OF THE INVENTION

The present invention has been made to solve the above-described conventional problems. Therefore, in case of forming an image by superimposing a plurality of colors of plane images, an object of the present invention is to superimpose these plurality of colors of plane images such that positions of these images are not displaced from others irrespective of a change in time or the like, thereby forming a high-quality color image.

Especially, taking into consideration that color image data is supplied from an external apparatus or the like, the object of the present invention is to superimpose the plurality of colors of plane images such that positions of these images are not displaced from others irrespective of the change in time or the like, thereby forming the high-quality color image.

In order to achieve the above object, according to one preferred embodiment of the present invention, there is provided an electronic apparatus comprising:

transmission means for transmitting, to the external apparatus which visibly outputs the color image by superimposing the plurality of colors of plane images, image data corresponding to the plurality of colors of plane images;

reception means for receiving information representing extent of a positional displacement occurred in case of superimposing the plurality of colors of plane images in the external apparatus; and control means for controlling timing of transmitting the image data corresponding to the plurality of colors of plane images by the transmission means, on the basis of the information received by the reception means.

The above and other objects of the present invention will become apparent from the following detailed description when read in conjunction with the accompanying drawings.

BRIEF DESCRIPTION OF THE DRAWINGS

FIG. 4 is a view showing an example of command/status managed between the CPU and the controller unit shown in FIG. 1;

FIG. 5 is a view showing an example of the command/status managed between the CPU and the controller unit shown in FIG. 1;

FIGS. 17A and 17B are schematic views for explaining the color displacement correcting process;

DETAILED DESCRIPTION OF THE PREFERRED EMBODIMENTS

Hereinafter, the embodiments of the present invention will be explained with reference to the accompanying drawings.

(First Embodiment)

Figure 1:
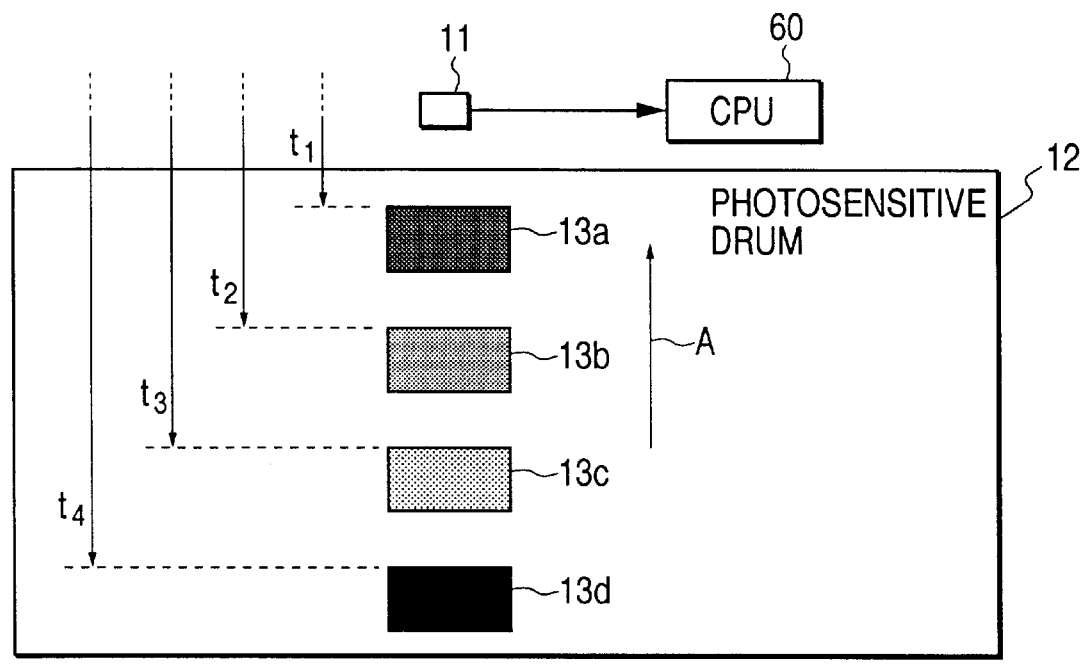
FIG. 1 is a block diagram for explaining main structure of an image formation apparatus according to a first embodiment of the present invention.
Figure 10:
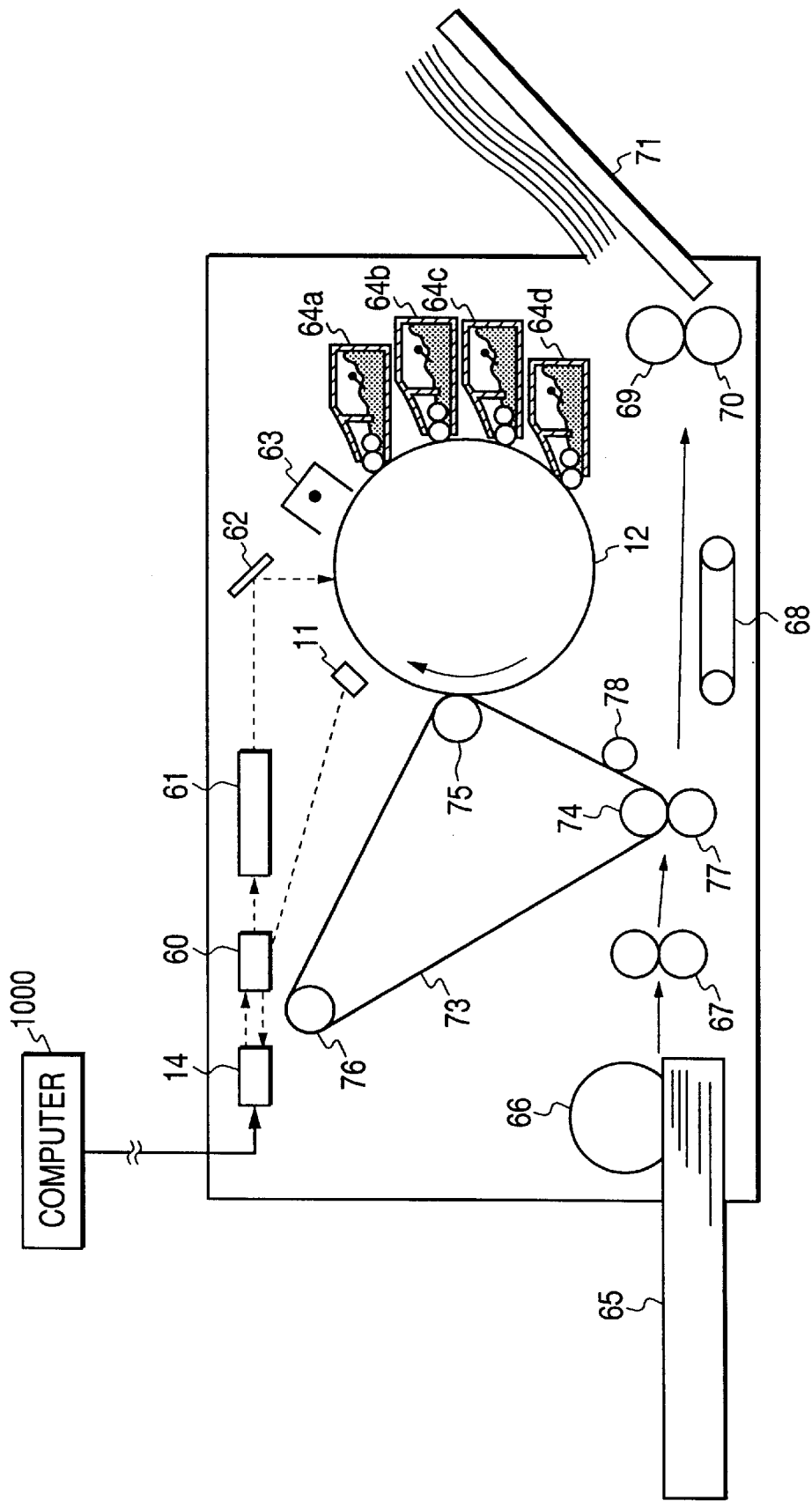
FIG. 10 is a schematic view for explaining structure of a general printer.

FIG. 1 is a block diagram for explaining main structure of an image formation apparatus according to the first embodiment of the present invention. In FIG. 1, it should be noted that the same parts as shown in FIG. 10 are added with the same reference numerals, respectively. Further, it should be noted that the present embodiment fundamentally includes such the structure and function as shown in FIG. 10. Hereinafter, characteristic parts of the present embodiment in case of using the printer in FIG. 10 will be explained in detail.

In the present embodiment, it should be noted that, in a case where an image formed on a photosensitive body is superimposed on a transfer body plural times to form a color image thereon, a so-called plane image represents the image of one image plane which is obtained by superimposing the image on the photosensitive body one time. That is, four planes (Y, M, C and Bk) are included in the plane image.

In FIG. 1, reference numeral 11 denotes an optical sensor (to be simply referred as a sensor hereinafter) which consists of a light emission element such as an LED or the like and a light reception element such as a photodiode CdS or the like; reference numeral 12 denotes a photosensitive drum; reference numerals 13a, 13b, 13c and 13d denote patches of respective color toners (e.g., magenta, cyan, yellow and black in turn) which have been transferred onto the photosensitive drum 12; reference numeral 60 denotes a one-chip microcomputer (to be referred as a CPU hereinafter) which includes therein a read-only memory (ROM); and reference symbols $t_1$, $t_2$, $t_3$ and $t_4$ respectively denote periods of time beginning from a state that the photosensitive drum 12 stops to states that the patches 13a, 13b, 13c and 13d are detected.

The color patches 13a, 13b, 13c and 13d are formed such that these patches continue at a constant interval along a rotational direction A on the photosensitive drum 12, and the sensor 11 optically measures or detects densities of these patches on the basis of their reflectances. In this case, the photosensitive drum 12 uniformly rotates at predetermined speed, and a position at which each patch is formed has been stored in the ROM of the CPU 60. Therefore, at a time when image signals representing these patches are outputted, it is supposed that these patches are formed logically at the constant interval on the photosensitive drum 12 without any displacement.

The sensor 11 in the present embodiment performs density detecting, and simultaneously counts the periods of time $t_1$, $t_2$, $t_3$ and $t_4$ respectively beginning from the state that the photosensitive drum 12 stops to the states that the color patches 13a, 13b, 13c and 13d are detected.

Hereinafter, the present embodiment will be explained in further detail.

In the first embodiment, there is provided an image formation means (i.e., laser scan unit) which forms the image on an image support body (i.e., photosensitive drum 12). A plurality of development means (i.e., development units 64a to 64d) which develop the image formed by the image formation means, by using development agents respectively having different colors. A generation means (i.e., image leading-edge sensor not shown) generates a predetermined reference signal in accordance with rotational driving of the image support body. A detection means (i.e., sensor 11) operates responsive to the predetermined reference signal, and reads a plurality of different-color patch images formed on the image support body by the image formation means to detect respective positions thereof. Also, first calculation means (i.e., CPU 60) which calculates an amount of positional displacement of each color image formed by the image formation means, on the basis of an output from the detection means, and a first control means detects the predetermined reference signal on the basis of the amount of positional displacement calculated by the first calculation means, and then corrects image formation timing of the image formation means to be used for forming each color image, in a sub-scan direction (i.e., the CPU 60 controls the laser driver 61 by executing a control program stored in the ROM or the like). When the sensor 11 operates according to the predetermined reference signal (i.e., TOP signal) generated by the image leading-edge sensor and reads the plurality of different-color patch images formed on the photosensitive drum 12 by the image formation means to detect the respective positions thereof, the CPU 60 calculates based on the detected position the amount of positional displacement of each color image formed by the image formation means, and the CPU 60 corrects generation timing of the TOP signal on the basis of the calculated amount of positional displacement, to transfer the obtained TOP signal to the controller unit 14, whereby the image formation timing of the image formation means to be used for forming each color image is corrected in the sub-scan direction.

Therefore, a transfer position of each color image in the sub-scan direction is corrected, so that the color image can be formed without any color displacement.

In the first embodiment, the image formation means forms the respective color patch images such that these images continue in a movement direction of the image support body (see FIG. 1). Therefore, the displacement of transfer position of each color image in the sub-scan direction can be detected only by the single detection means (i.e., sensor 11).

Figure 2:
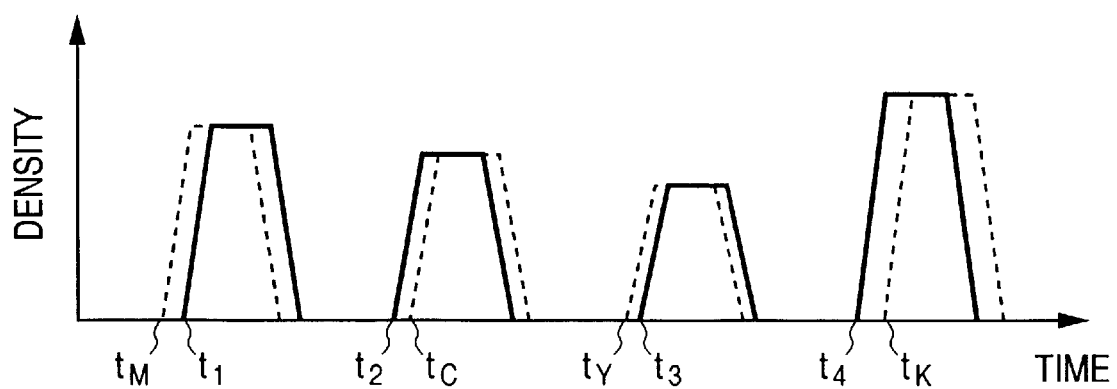
FIG. 2 is a characteristic chart showing a change in density patch detecting which is sensed by a sensor shown in FIG. 1.

FIG. 2 is a characteristic view showing a change in density patch detecting by the sensor 11 shown in FIG. 1. In FIG. 2, an axis of ordinate represents density and an axis of abscissa represents time.

In FIG. 2, reference symbols $t_M$, $t_C$, $t_Y$ and $t_K$ respectively denote logical detecting times. In this case, values ($t_M$–$t_1$), ($t_C$–$t_2$), ($t_Y$–$t_3$) and ($t_K$–$t_4$) are the displacement amounts of respective colors from their logical values, and such respective correlations are recognized as the color displacement amounts by the CPU 60. The recognized color displacement amounts are notified to the controller unit 14 in the form of command/status, and transmitting and receiving of the command/status are performed by using serial communication as shown in FIG. 3.

Figure 3:
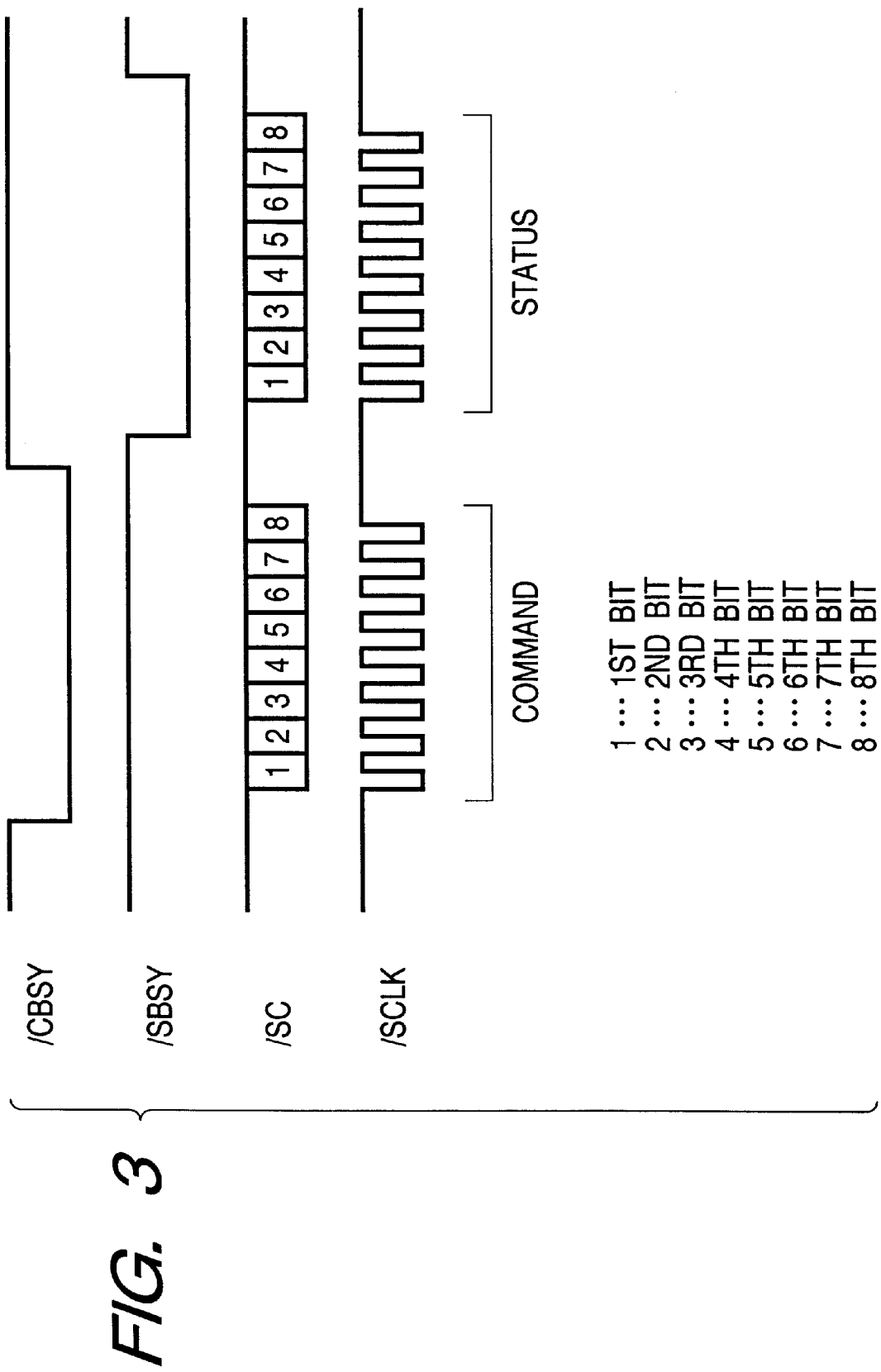
FIG. 3 is a timing chart for explaining a communication process between a CPU and a controller unit shown in FIG. 1.

FIG. 3 is a timing chart for explaining a communication process between the CPU 60 in FIG. 1 and the controller unit 14 in FIG. 10.

In a case where the controller unit 14 transmits the command to the CPU 60 and receives the status from the CPU 60, the controller unit 14 firstly turns on a command busy signal line (/CBSY signal line). While the /CBSY signal line is being turned on, the unit 14 puts the one-byte (i.e., eight bits) command on a status/command signal line (/SC signal line) from its first bit to eighth bit in turn, and transmits the command by using eight sync pulses from a serial clock signal line (/SCLK signal line). Then, the unit 14 turns off the /CBSY signal line.

Thereafter, the CPU 60 turns on a status busy signal line (/SBSY signal line). While the /SBSY signal line is being turned on, the CPU 60 puts the one-byte status on the /SC signal line from its first bit to eight bit in turn, and transmits the status by using eight sync pulses from the /SCLK signal line. Then, the CPU 60 turns off the /SBSY signal line.

The above-described /CBSY signal line, the /SBSY signal line, the /SC signal line and the /SCLK signal line are connected between the controller unit 14 and the CPU 60 through a video interface.

FIGS. 4 and 5 are views each showing an example of the command/status managed between the CPU 60 and the controller unit 14 shown in FIG. 1.

As shown in FIGS. 4 and 5, a color displacement amount notification command in a sub-scan direction of M is represented as F1(H), a color displacement amount notification command in a sub-scan direction of C is represented as F2(H), a color displacement amount notification command in a sub-scan direction of Y is represented as F4(H), and a color displacement amount notification command in a sub-scan direction of Bk is represented as F7(H). The status of one byte consisting of an error bit, color displacement amount data and a parity bit is returned to each command.

The color displacement amount data consists of a code bit and data. In such code bit, "0" represents the positive code bit and "1" represents the negative code bit. Further, such data has a resolution of 10 μsec which is represented from bit 4 (MSB) to bit 0 (LSB), and the resolution can be arbitrarily changed according to extent of the color displacement (or aberration).

For example, in a case where the color displacement amount is +20 μsec, the color displacement amount data is represented by "000010(B)". If the error bit and the parity bit are added, the data is represented by "00000100(B),04 (H)".

In a case where the color displacement amount is –40 μm, the color displacement amount data is represented by "100100(B)". If the error bit and the parity bit are added, the data is represented by "01001001(B),49(H)".

When the amount of color displacement for each color is notified to the controller unit 14 shown in FIG. 10 in such a manner as described above, the controller unit 14 corrects a period of time beginning from a vertical sync signal in each color to sending of a video signal, by the amount of displacement necessary for compensating the color displacement generated in case of superimposing each color.

In the present embodiment, the time counting is performed on the basis of a predetermined stop position of the photosensitive drum 12. However, a method in which the amount of color displacement is calculated on the basis of the patch of one specific color (e.g., first-color patch 13a) is also included in the scope of the present invention. Further, the patch can be formed not only on the photosensitive body but also on the transfer body. In this case, the sensor 11 is provided on the transfer body. Furthermore, the amount of color displacement may be sensed or detected by reading each patch with a scanner or the like after the patch is once formed on the transfer body (i.e., paper or the like).

In the present embodiment, the amount of positional displacement is sensed or detected by sequentially performing the patch forming of four colors. However, even if the patch is formed by rotating the photosensitive drum four times with one color (i.e., not four colors), the same effect can be obtained. In this case, the processes for the amounts of patch (i.e., color) displacement in the first-, second-, third- and fourth-time rotations may be performed in the same manner as for the amounts of positional displacement in the first, second, third and fourth colors. Further, the patches of four colors may be formed by using not only one color but also two or three colors.

(Second Embodiment)

Figure 6:
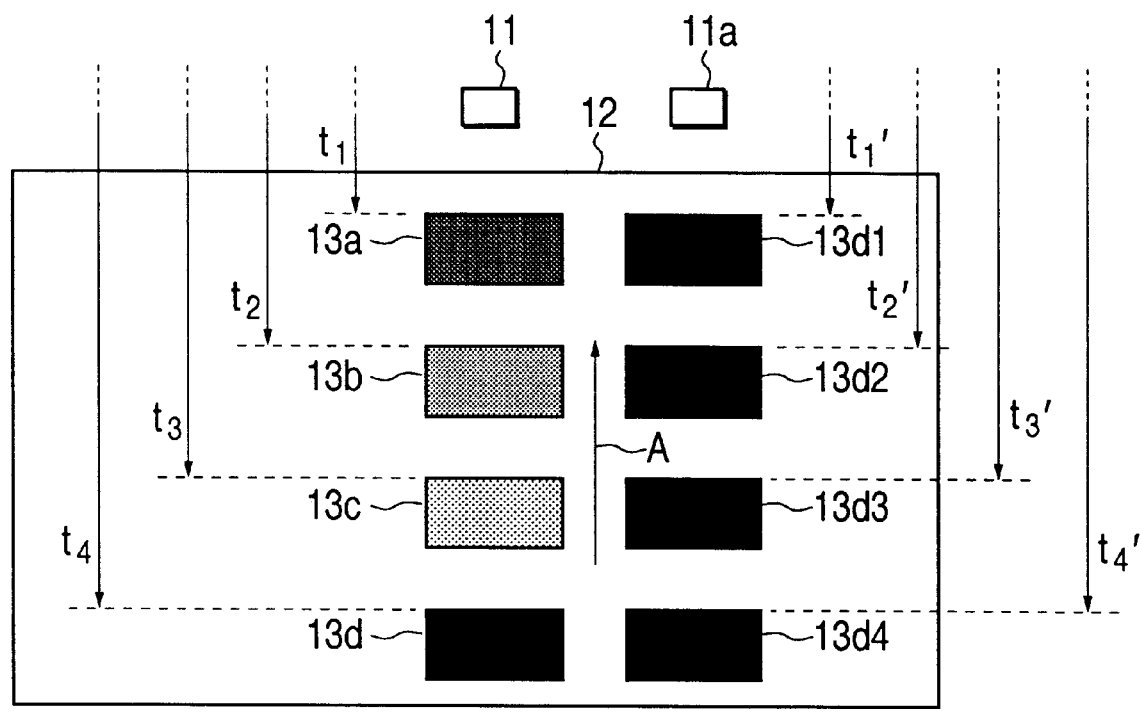
FIG. 6 is a block diagram for explaining structure of an image formation apparatus according to a second embodiment of the present invention.

FIG. 6 is a block diagram for explaining structure of an image formation apparatus according to the second embodiment of the present invention. In FIG. 6, the same parts as shown in FIG. 1 are added with the same reference numerals. Like the first embodiment, it should be noted that the present embodiment fundamentally includes such the structure as shown in FIG. 10. Hereinafter, characteristic parts of the present embodiment will be explained in detail.

In FIG. 6, reference numerals 11 and 11a denote optical sensors (to be simply referred as sensors hereinafter) which have the same function as that in the optical sensor 11 shown in FIG. 11; reference numerals 13d1, 13d2, 13d3 and 13d4 denote patches of a specific color (e.g., black) toner which have been transferred onto a photosensitive drum 12; and reference symbols $t_1'$, $t_2'$, $t_3'$ and $t_4'$ denote periods of time respectively beginning from a state that the photosensitive drum 12 stops up to states that the patches 13d1, 13d2, 13d3 and 13d4 are detected.

The sensors 11 and 11a are arranged in parallel for a rotational direction A of the photosensitive drum 12. Further, on the drum 12, a color patch 13a is formed in parallel with the patch 13d1, a color patch 13d is formed in parallel with the patch 13d2, a color patch 13c is formed in parallel with the patch 13d3, and a color patch 13d is formed in parallel with the patch 13d4. These color patches 13a, 13b, 13c and 13d and these patches 13d1, 13d2, 13d3 and 13d4 are formed on the photosensitive drum 12 without any displacement or aberration, under signal processing. In this operation, the patches 13d1, 13d2, 13d3 and 13d4 are formed by a one-time rotating operation of the photosensitive drum 12, with use of one specific color (e.g., black). Each pair of patches (i.e., 13a and 13d1, 13b and 13d2, 13c and 13d3, or 13d and 13d4) arranged in parallel for the two optical sensors 11 and 11a is used to calculate the period of time beginning from the state that the photosensitive drum 12 stops up to the state that the drum 12 rotates in the direction A and such the pair of patches is detected. Thus, an amount of displacement between the patches in one pair is detected. In other words, there are calculated which patch (e.g., 13a or 13d1) is displaced and what extent the patch is displaced.

Hereinafter, the present embodiment will be explained in further detail.

In the second embodiment, there are provided an image formation means which forms an image on an image support body, and a plurality of development means (i.e., development units 64a to 64d) which develop the image formed by the image formation means, by using development agents respectively having different colors. A generation means (i.e., image leading-edge sensor not shown) generates a predetermined reference signal in accordance with rotational driving of the image support body. A first detection means (i.e., sensor 11) operates responsive to the predetermined reference signal, and reads a plurality of different-color patch images formed on the image support body by the image formation means to detect respective positions thereof, and a second detection means (i.e., sensor 11a) which operates responsive to the predetermined reference signal, and reads a plurality of same-color patch images formed on the image support body by the image formation means to detect respective positions thereof.

Also, a second calculation means (i.e., CPU 60) calculates an amount of positional displacement of each color image formed by the image formation means, on the basis of outputs from the first and second detection means, and a second control means detects the predetermined reference signal on the basis of the amount of positional displacement calculated by the second calculation means, and then corrects image formation timing of the image formation means to be used for forming each color image, in a sub-scan direction (i.e., the CPU 60 controls the correcting by executing a control program stored in a ROM or the like). When the sensor 11 operates according to a TOP signal generated by the image leading-edge sensor and reads the plurality of different-color patch images formed on the image support body by the image formation means to detect the respective positions thereof, and when the sensor 11a operates according to the predetermined reference signal and reads the plurality of same-color patch images formed on the image support body by the image formation means to detect the respective positions thereof, the CPU 60 calculates based on the detected positions the amount of positional displacement of each color image formed by the image formation means. Also the CPU 60 corrects generation timing of the reference signal on the basis of the calculated amount of positional displacement, to transfer the obtained signal to a controller unit 14, whereby the image formation timing of the image formation means to be used for forming each color image is corrected in its sub-scan direction.

Therefore, a transfer position of each color image in the sub-scan direction is accurately corrected, so that the color image can be formed without any color displacement.

Further, the image formation means forms a first patch image group (13a to 13d) and a second patch image group (13d1 to 13d4) such that the patches included in the groups continue along a movement direction of the image support body and the first and second groups are arranged in parallel along a direction perpendicular to the movement direction of the image support body. Therefore, the positional displacement in transferring of each color image in the sub-scan direction can be accurately detected by the plurality of detection means (i.e., sensors 11 and 11a).

Like the first embodiment, the first patch image group is formed by performing an image forming operation on the photosensitive drum 12 four times, and the second patch image group is formed by performing the image forming operation one time. For this reason, the second patch image group acts as a positional basis.

Figure 7:
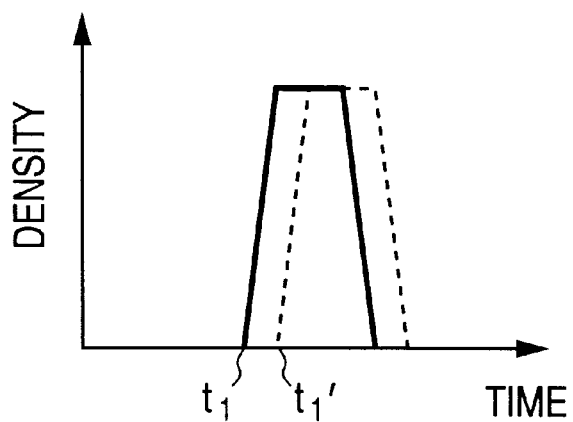
FIG. 7 is a characteristic chart showing a change in density of each patch which is sensed by each sensor shown in FIG. 6.

FIG. 7 is a characteristic view showing a density change in each patch (e.g., Y patch) detected by each of the sensors 11 and 11a shown in FIG. 6. In FIG. 7, an axis of ordinate represents a density and an axis of abscissa represents time.

In FIG. 7, reference symbols $t_1$ and $t_1'$ respectively denote detecting times. A difference between the detecting times $t_1$ and $t_1'$ is detected as a displacement amount of arbitrary color for one specific color. Similarly, by calculating a difference between the detecting times $t_2$ and $t_2'$, a difference between the detecting times $t_3$ and $t_3'$ and a difference between the detecting times $t_4$ and $t_4'$ with the CPU 60, the displacement amounts between the adjacent colors can be obtained, so that the color displacement is corrected in the same process as in the first embodiment.

In the present embodiment, the two optical sensors are provided, but a further plurality of sensors may be provided. Like this, by providing many sensors, color displacement information of many colors can be read simultaneously, whereby processing speed can be improved.

Further, in the present embodiment, only the patch 13d1 may be formed as the second patch image group. In this case, by using the patch 13d1 as the basis, the positional displacements of the first, second, third and fourth colors may be detected to correct the respective amounts of displacement in the same manner as in the first embodiment.

Like the first embodiment, in the present embodiment, the patch may be formed not only on the photosensitive drum 12 but also the image support body such as a transfer drum, a transfer body or the like. In this case, the sensors 11 and 11a are provided on the image support body.

(Third Embodiment)

In the above-described embodiments, the color displacement correction in the sub-scan direction has been explained. However, the present invention can be applied to the color displacement correction in a main-scan direction. Hereinafter, the third embodiment as to the correction in the main-scan direction will be explained.

Figure 8:
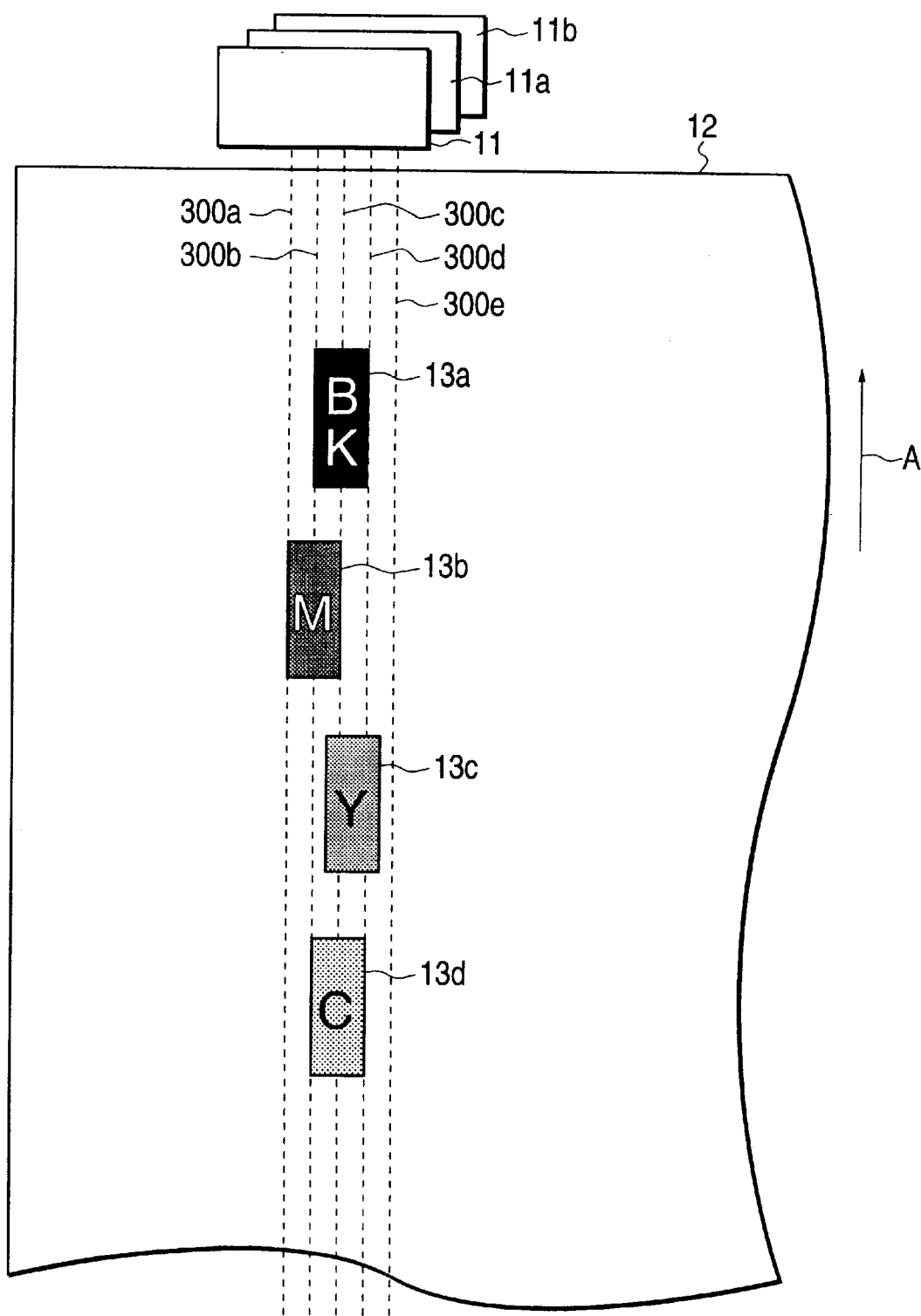
FIG. 8 is a block diagram for explaining structure of an image formation apparatus according to a third embodiment of the present invention.
Figure 9:
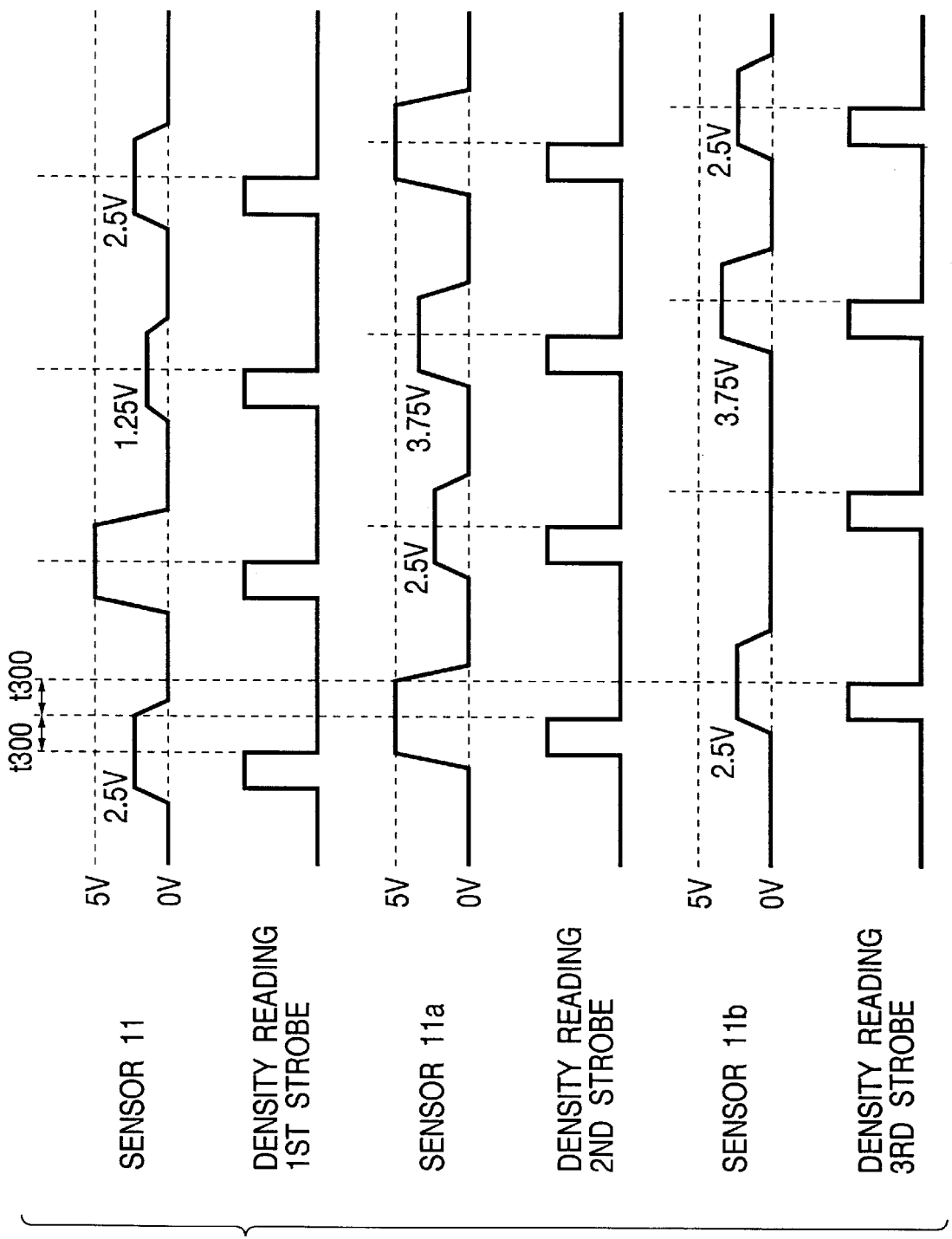
FIG. 9 is a timing chart for explaining operations of the image formation apparatus shown in FIG. 8.

FIG. 8 is a block diagram for explaining internal structure of an image formation apparatus according to the third embodiment of the present invention. In FIG. 8, the same parts as those in FIGS. 1 and 6 are added with the same reference numerals, respectively. Further, like the first and second embodiments, the fundamental structure in the third embodiment is substantially the same as that shown in FIG. 10. FIG. 9 is a timing chart for explaining an operation procedure shown in FIG. 8. It should be noted that FIG. 8 is the diagram showing the partial structure of a periphery of a photosensitive drum 12 which forms a patch.

In FIG. 8, reference numeral 11b denotes an optical sensor (to be referred simply as sensor hereinafter) which is equivalent to the sensors 11 and 11a shown in FIG. 6. As shown in FIG. 8, sensors 11, 11a and 11b are arranged to be apart from others by a constant distance in the main-scan direction.

The sensor 11 performs reading within a range between dotted lines 300a and 300c including a dotted line 300b as the center, the sensor 11a performs reading within a range between the dotted lines 300b including the dotted line 300c as the center, and the sensor 11b performs reading within a range between the dotted lines 300c and 300e including the dotted line 300d as the center. Other operations and processes are the same as those in the above-described first and second embodiments, wherefore the explanation thereof will be omitted.

It is assumed that the widths of patches 13a, 13b, 13c and 13d are identical to a sensor reading width.

For example, if the sensor reading width is 4 mm, a distance between the adjacent dotted lines is 2 mm (i.e., half of 4 mm), and the width of each patch is 4 mm.

A density reading value is stored in an analog port (not shown) in a CPU 60. If the patch is positioned completely (i.e., 100%) within the reading width, 5v is obtained. On the other hand, if the patch is positioned completely outside of the reading width, 0v is obtained. Between such two states, the obtained value linearly varies. For example, if the patch is positioned within the reading width by 50%, 2.5v is obtained.

A density read strobe which is provided for each sensor determines the reading value in response to trailing or fall of a strobe signal. Since the sensor is provided for each density read strobe, each strobe is delayed by time "t300" minutes. The time "t300" is determined according to a width of the sensor and process speed of an image record apparatus.

Hereinafter, a method for reading the densities of the patches arranged on the photosensitive drum 12 shown in FIG. 8 and a method for calculating the displacements of the patches in the main-scan direction will be explained.

For example, in FIG. 8, the Bk patch 13a, the M patch 13b, the Y patch 13c and the C patch 13d are in turn formed continuously in a sub-scan direction A of the photosensitive drum 12. The sensors 11, 11a and 11b respectively read the density of each color patch in the above order. In this case, it is assumed that the densities of respective colors have the same level. A method for unifying the density levels is included in a known technique, whereby the explanation thereof is omitted.

Initially, the sensors 11, 11a and 11b read the density of the Bk patch 13a, and then 2.5v, 5v and 2.5v are obtained respectively from the sensors 11, 11a and 11b. Therefore, the Bk patch 13a is positioned within the range between the dotted lines 300a and 300c by 50%, the range between the dotted lines 300b and 300d by 100%, and the range between the dotted lines 300c and 300e by 50%.

Then, the sensors 11, 11a and 11b read the density of the M patch 13b, and then 5v, 2.5v and 0v are obtained respectively from the sensors 11, 11a and 11b. Therefore, the Bk patch 13b is positioned within the range between the dotted lines 300a and 300c by 100%, the range between the dotted lines 300b and 300d by 50%, and the range between the dotted lines 300c and 300e by 0%.

Thereafter, the sensors 11, 11a and 11b read the density of the Y patch 13c, and then 1.25v, 3.75v and 3.75v are obtained respectively from the sensors 11, 11a and 11b. Therefore, the Y patch 13c is positioned within the range between the dotted lines 300a and 300c by 25%, the range between the dotted lines 300b and 300d by 75%, and the range between the dotted lines 300c and 300e by 75%.

Finally, the sensors 11, 11a and 11b read the density of the C patch 13d, and then 2.5v, 5v and 2.5v are obtained respectively from the sensors 11, 11a and 11b. Therefore, the C patch 13d is positioned within the range between the dotted lines 300a and 300c by 50%, the range between the dotted lines 300b and 300d by 100%, and the range between the dotted lines 300c and 300e by 50%.

In a case where the patch is positioned within the range between the dotted lines 300a and 300c by 50%, the range between the dotted lines 300b and 300d by 100% and the range between the dotted lines 300c and 300e by 50%, such the patch is considered to be positioned at a reference position. If the patches 13a to 13d are positioned at the reference position, the amount of displacement of the Bk patch 13a is 0 mm, the amount of displacement of the M patch 13b is −2 mm, the amount of displacement of the Y patch 13c is +1 mm, and the amount of displacement of the C patch 13d is 0 mm.

In order to notify the controller unit 14 in FIG. 10 of the amount of displacement, there is a method which uses a distance or the time. These distance and time have been previously determined between the CPU 60 and the controller unit 14. In the present embodiment, it is assumed that the amount of displacement is notified by using the time. Such the time can be obtained by dividing main-scan speed into the amount of displacement represented by the distance. Therefore, in a case where the main-scan direction is 100 m/sec, the time of displacement for black (Bk) is 0 μsec, the time of displacement for magenta (M) is −20 μsec, the time of displacement for yellow (Y) is 10 μsec and the time of displacement for cyan (C) is 0 μsec.

A displacement time notification command in a main-scan direction of Bk is represented by E0(H), a displacement time notification command in a main-scan direction of M is represented by E3(H), a displacement time notification command in a main-scan direction of Y is represented by E5(H), a displacement time notification command in a main-scan direction of C is represented by E6(H), and resolution of a data portion in status is 10 μsec. Methods for transmitting and receiving command/status are the same as those in the above-described embodiments, whereby the explanation thereof is omitted.

On the basis of the time of displacement in the main-scan direction of each color which time has been received from the CPU, the controller unit 14 corrects a period of time beginning from a horizontal sync signal for each color up to transmitting of a vide signal.

Hereinafter, the present embodiment will be explained in more detail.

In the third embodiment, there are provided an image formation means which forms an image on an image support body (i.e., photosensitive drum 12 in this case), and a plurality of development means (i.e., development units 64a to 64d) which develop the image formed by the image formation means, by using development agents respectively having different colors. A sync signal generation means (i.e., BD sensor not shown) generates a sync signal in a main-scan direction on the image support body. A plurality of detection means (i.e., sensors 11, 11a and 11b arranged at the interval shown in FIG. 8) operate responsive to the sync signal, and read a plurality of different-color patch images formed on the image support body by the image formation means to respectively detect effective patch image regions in the main-scan direction perpendicular to a moving direction of the image support body. A calculation means (i.e., CPU 60) calculates the amount of positional displacement or aberration in the main-scan direction of each color image formed by the image formation means, on the basis of an output of each detection means, and a control means which detects the sync signal on the basis of the amount of positional displacement in the main-scan direction calculated by the calculation means, and then corrects image formation timing of the image formation means to be used for forming each color image, in the main-scan direction (i.e., CPU 60 controls the correcting by executing a control program stored in a not-shown ROM).

Each of the sensors 11, 11a and 11b operates responsive to the sync signal (i.e., BD signal) generated by the BD sensor and reads the plurality of different-color patch images formed on the image support body by the image formation means to detect each effective patch image region in the main-scan direction perpendicular to the moving direction of the image support body. The CPU 60 calculates based on each detected output the amount of positional displacement in the main-scan direction of each color image formed by the image formation means, and corrects the image formation timing of the image formation means to be used for forming each color image in the main-scan direction, after detecting the BD signal on the basis of the calculated amount of positional displacement in the main-scan direction. Thus, a positional displacement region in the main-scan direction of each different-color patch can be surely detected, a transfer position of each color image can be accurately corrected in the main-scan direction, and a color image can be resultingly formed without any color displacement or aberration.

In order to increase accuracy in measuring or detecting of the amount of color displacement in the main-scan direction, the sensor having narrow reading width may be used, a number of sensors may be arranged at narrow intervals, or width of the patch may be narrowed in its main-scan direction.

In the present embodiment, three sensors are used. However, in a case of using the image formation apparatus in which the sensor reading width and the patch width are identical and the amount of displacement between these widths is minute, even if only one sensor is used, it is obviously understood that the same effect as in case of using the three sensors can be obtained by arranging the edge of the patch at the center portion in the sensor reading region.

The present invention can be applied to a system constructed by a plurality of equipments or can be also applied to an apparatus comprising a single equipment. Further, it is obviously understood that the present invention can be applied to a case where the above-described embodiments can be realized by supplying a program to the system or the apparatus. In this case, if the system or the apparatus reads a storage medium in which the program represented by a software for realizing the present invention has been stored, such the system or the apparatus can derive the above-described effects of the present invention.

Further, if the program represented by the software for realizing the present invention is downloaded from a database on a network by using a communication program, such the system or the apparatus can derive the effects of the present invention.

It should be noted that the above-described embodiments include a light emission unit which emits onto the image support body a laser beam modulated based on image information, a rotational polygon mirror which deflects the laser beam emitted from the light emission unit, and an optical system which focuses the deflected laser beam on the image support body. Further, the image support body includes the photosensitive drum, a photosensitive belt, an intermediate transfer member onto which the image developed on the photosensitive drum is transferred, a recording paper or the like.

According to the above-described embodiments, it can be eliminated that the image blurs and the image is doubly seen because of color displacement, whereby the image quality can be improved. Further, it can be prevented that the amounts of color displacement in the sub-scan and main-scan directions increase because of a mechanical difference for each image formation apparatus, a difference due to a change in circumstances, deterioration of parts due to endurance and the like.

Furthermore, since the sensor 11 also acts as a density sensor, any new circuit and parts are unnecessary in a patch image detection mechanism, whereby such the patch image detection mechanism can be manufactured at low cost.

Furthermore, the image formation apparatus performs the correcting process in a short period of time, at predetermined timing (i.e., at the time of turning on a power source, every time the predetermined number of image formation are performed, every time a predetermined period of time elapses, or the like). Therefore, the user can continuously form the image without any positional displacement, at any time.

In the above-described embodiments, the positional displacement or aberration of each color is controlled by changing output timing of each color image signal outputted from the controller unit 14 in the printer. However, if information concerning the amount of displacement of each color in each direction (i.e., main-scan or sub-scan direction) described in the above embodiments is sent to an image signal generation apparatus such as an external computer 1000 (see FIG. 10) or the like and then such the external image signal generation apparatus controls the output timing of each color image signal, a load of the printer itself shown in FIG. 10 can be reduced. A method to do so will be explained in detail in an another embodiment.

Further, the computer 1000 (see FIG. 10) may perform displaying on a monitor in accordance with the amount of displacement. Therefore, the present invention includes a case where the computer 1000 directly displays the amount of displacement of each color or performs the displaying to select whether the outputting of the image signal is to be cancelled or not. In other words, the present invention includes a case where some process for the amount of displacement is performed at the external image signal generation apparatus.

The present invention can be applied to the system constructed by the plurality of equipments (e.g., host computer, interface equipment, reader, printer and the like) or can be also applied to the apparatus comprising the single equipment (e.g., copy machine, facsimile machine).

The invention employed by a method wherein program codes of a software to realize the functions of the above-described first to third embodiments are supplied to a computer in an apparatus or a system connected to various devices so as to make the devices operative in order to realize the functions of the above-described embodiments and the various devices-are operated in accordance with the programs stored in the computer (CPU or MPU) of the system or apparatus is also included in the scope of the present invention.

In such a case, the program codes themselves of the software realize the functions of the above-described embodiments and the program codes themselves and means for supplying the program codes to the computer, e.g., a storage medium in which the program codes have been stored construct the present invention.

As such a memory medium to store the program codes, e.g., it is possible to use a floppy disk, a hard disk, an optical disk, a magneto-optical disk, a CD-ROM, a magnetic tape, a nonvolatile memory card, a ROM or the like can be used.

Also, there is included in the scope of the present invention not only a case where the functions of the above-described embodiments are realized by execution of the supplied program codes by the computer but also a case where the functions of the foregoing embodiments are realized in cooperation with the OS (operating system) by which the program codes operate in the computer or other application software or the like.

Further, the present invention also includes a case where the supplied program codes are stored into a memory provided for a function expansion board of a computer or a function expansion unit connected to a computer and, after that, a CPU or the like provided for the function expansion board or the function expansion unit executes a part or all of the actual processes on the basis of instructions of the program codes, and the functions of the above-described embodiments are realized by the processes.

As explained above, according to the present invention, the plurality of position detection images formed on the image support body are detected by the plurality of times of plane image forming operations, and the control signal for controlling the generation timing of the plurality of color image signals is outputted to the predetermined generation means or the external generation means. Therefore, the plane image forming for each color can start at the timing for compensating the positional displacements of the plurality of position detection images formed on the image support body, whereby the plane image of each color can be accurately superimposed.

Further, according to the present invention, the plurality of position detection images formed in parallel on the image support body are detected by the plurality of times of plane image forming operations, and the control signal for controlling the generation timing of the plurality of color image signals is outputted to the predetermined generation means or the external generation means. Therefore, the plane image forming for each color can start at the timing for compensating the positional displacements of the plurality of position detection images formed on the image support body, whereby the plane image of each color can be accurately superimposed.

Furthermore, according to the present invention, the plurality of position detection images formed on the image support body are detected by the plurality of times of plane image forming operations, the control signal for controlling the generation timing of the plurality of color image signals is received by the external electronic apparatus, and thus the external electronic apparatus controls the output timing of the plurality of color image signals. Therefore, the image formation apparatus side can start the image forming based on the received plane image information of each color at the timing for compensating the positional displacements of the plurality of position detection images formed on the image support body, whereby the plane image of each color can be accurately superimposed.

Furthermore, according to the present invention, each detection means operates responsive to the sync signal generated from the sync signal generation means and reads the plurality of different-color patch images formed on the image support body by the image formation means so as to detect the effective patch image region in the main-scan direction perpendicular to the moving direction of the image support body, the calculation means calculates based on each detected output the amount of positional displacement in the main-scan direction of each color image formed by the image formation means, and the control means detects the sync signal and then corrects the image formation timing of the image formation means to be used for forming each color image in the main-scan direction, on the basis of the calculated amount of positional displacement in the main-scan direction. Therefore, the positional displacement region of each different-color patch in the main-scan direction can be surely detected, and thus the transfer position of each color image in the main-scan direction can be accurately corrected, whereby the color image without any color displacement can be formed.

As a result, since the different-color images are transferred on the image support body without positional displacement irrespective of the change in time or the like, it can be derived the significant effect that the high-quality color image can be continuously formed, and the like.

(Fourth Embodiment)

Initially, structure of a printer to be used in the following embodiments and relation between such the printer and a host computer will be briefly explained with reference to FIG. 11. In the fourth embodiment, the printer will be explained as a laser beam printer, but the present invention is not limited to such the laser beam printer. That is, it is obviously understood that the present invention can be applied to a case where an ink-jet printer forming a color image by using a plurality of kinds of ink, or the like is used.

Figure 11:
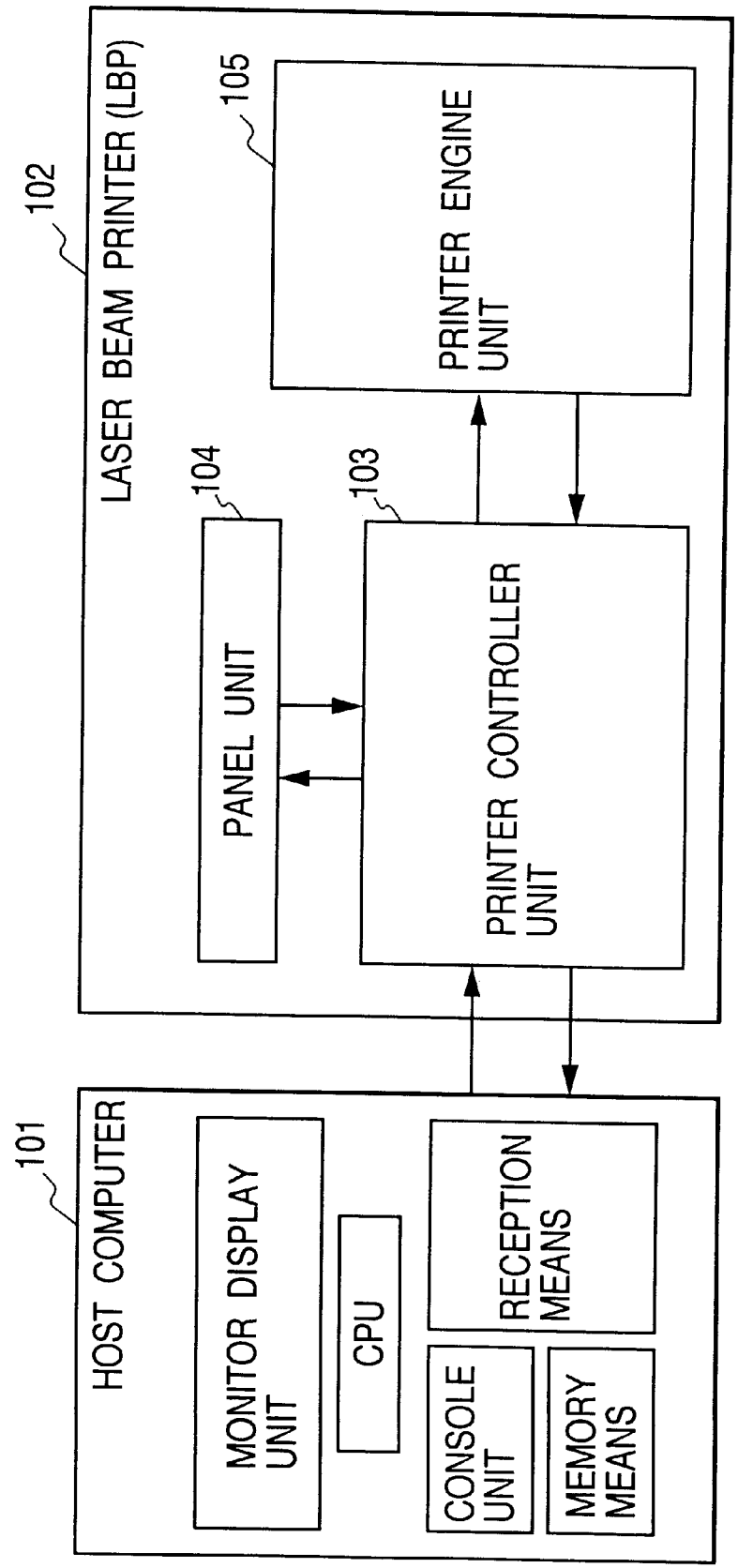
FIG. 11 is a block diagram showing a laser beam printer capable of being utilized to explain each embodiment.
Figure 12:
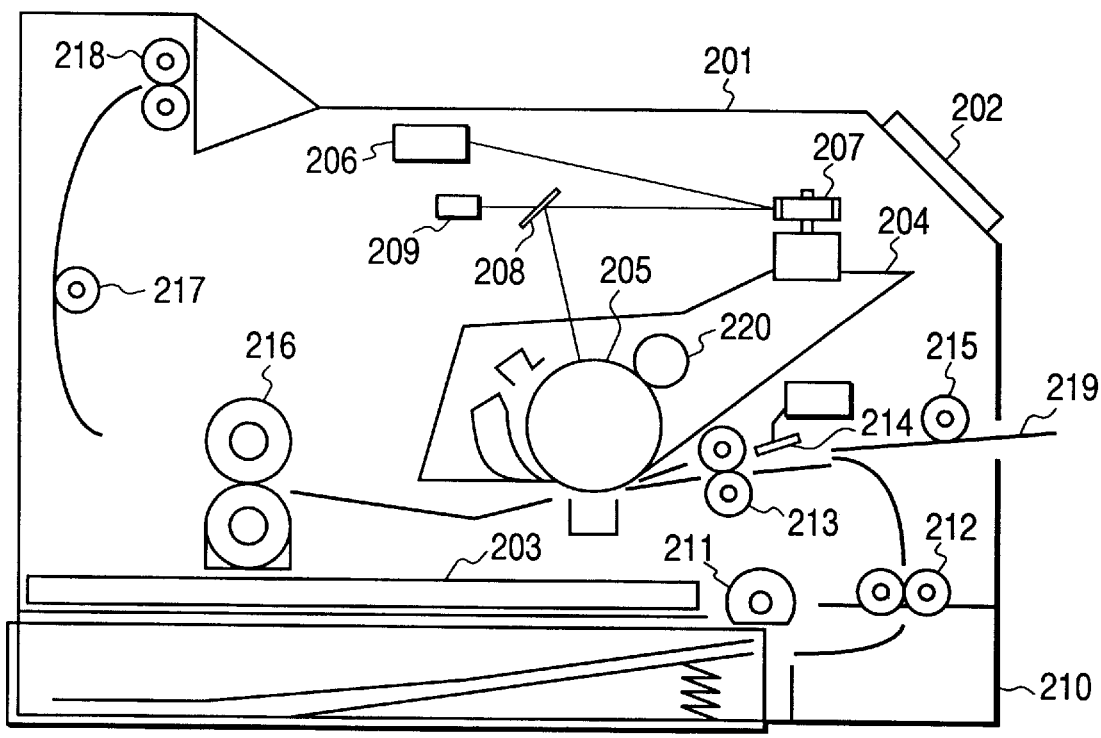
FIG. 12 is a schematic view showing a mechanism of the laser beam printer used to explain each embodiment.
Figure 13:
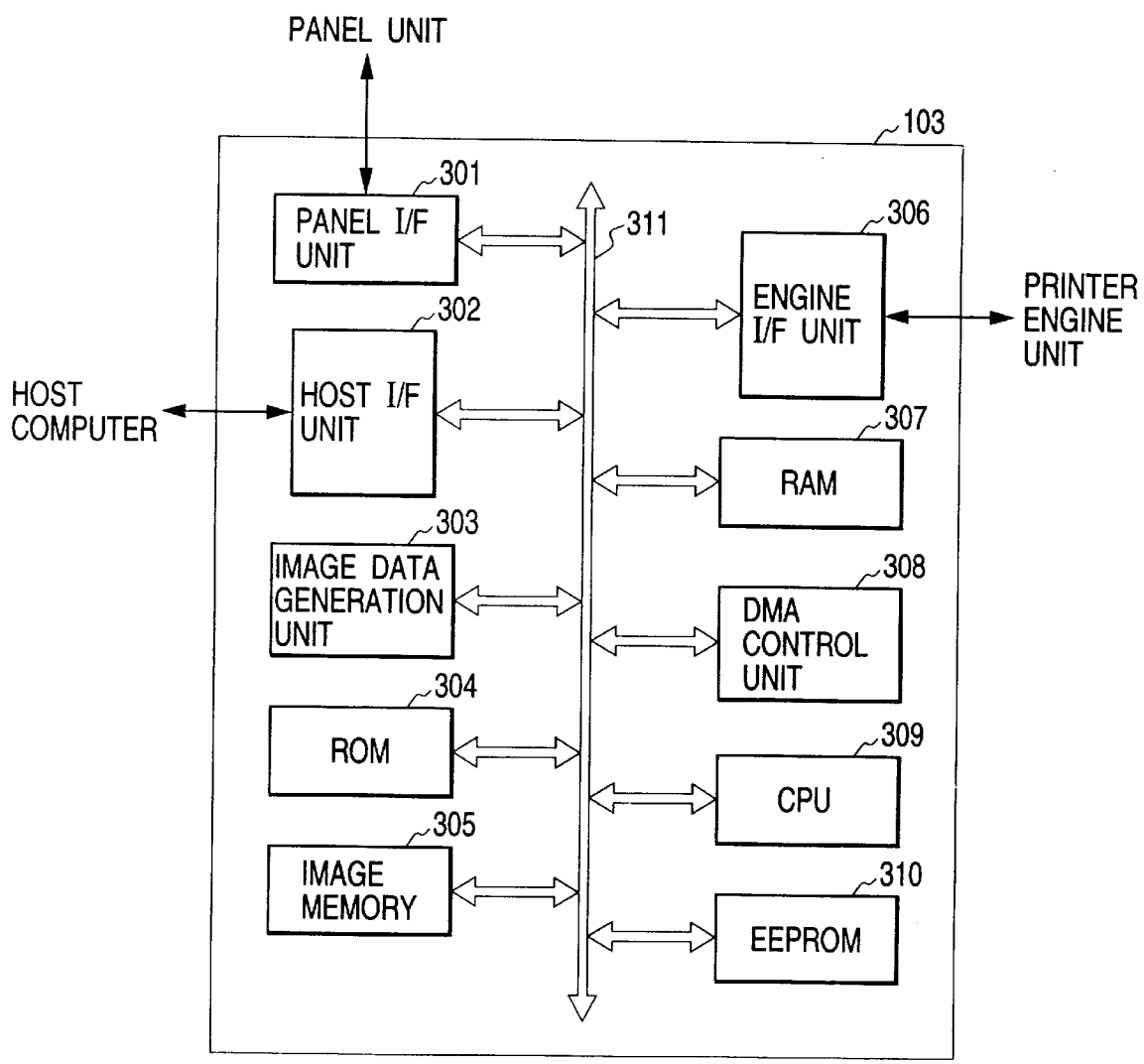
FIG. 13 is a block diagram showing a printer controller which is included in the laser beam printer used to explain each embodiment.
Figure 14:
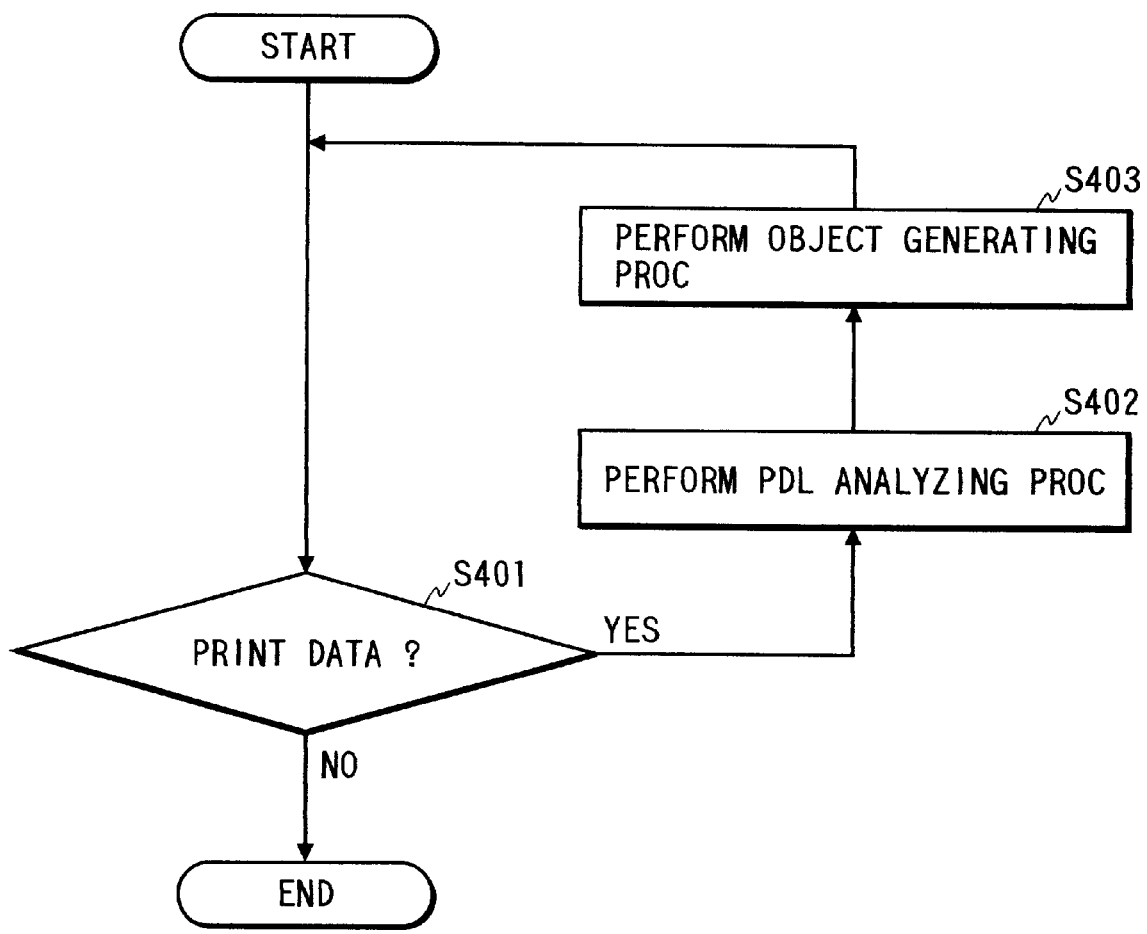
FIG. 14 is a flow chart showing a procedure for generating page object information by the printer controller included in the laser beam printer.

FIG. 11 is a block diagram showing the structure of the laser beam printer (to be referred as LBP hereinafter) 102 used in the fourth embodiment of the present invention, FIG. 12 is a schematic view showing an internal mechanism of the LBP 102 in FIG. 11, FIG. 13 is a block diagram showing internal structure of a printer controller unit 103 included in the LBP 102 in FIG. 11, and FIG. 14 is a flow chart showing procedure in case of forming page object information by the printer controller unit 103 of the LBP 102 in FIG. 11.

In FIG. 11, the LBP 102 inputs information (to be referred as print data hereinafter) which includes color multivalue image data described in a predetermined page description language (to be referred as PDL hereinafter) by an external apparatus or equipment represented by a host computer 101 or the like, and develops the inputted print data to ordinary image data by analyzing the print data based on the PDL.

Further, the host computer 101 includes therein a CPU for controlling the computer as a whole, a reception means for performing various communication controlling to the external apparatus including the LBP 102, a console unit for manually inputting various operation information into the entire computer, a memory means for storing a program used by the CPU, communication data and the like, and a monitor display unit for displaying the data stored in the memory means and a command input state sent from the console unit.

The LBP 102 in FIG. 11 is composed of the printer controller unit 103, a printer engine unit (to be referred as engine hereinafter) 105 for printing on a printing paper an image represented by the image data developed by the printer controller unit 103, and a panel unit 104 for interfacing the LBP 102 with a user and instructing desired operations for the LBP 102.

Subsequently, the internal mechanism of the LBP 102 will be explained with reference to FIG. 12.

As shown in FIG. 12, the LBP 102 has a housing 201. The housing 201 internally has mechanisms for constructing the engine 105, an engine control unit (not shown) for controlling a printing process (e.g., paper feeding process or the like) by each mechanism, and a control board holding unit 203 for holding the printer controller unit 103 shown in FIG. 11.

As the mechanisms for constructing the engine 105, by broad classification, there are an optical process mechanism, a fixing process mechanism, a paper feeding process mechanism and a carrying process mechanism. In these mechanisms, the optical process mechanism is to form a latent image on a photosensitive drum by laser beam scanning, make the latent image emergent and transfer the emerged image onto the printing paper, the fixing process mechanism is to fix a toner image transferred onto the printing paper, the paper feeding process mechanism is to feed the printing paper, and the carrying process mechanism is to carry the printing paper.

The optical process mechanism has a laser driver 206 which on/off drives the laser beam emitted from a semiconductor laser (not shown), in response to the image data sent from the printer controller unit 103. Such the laser beam emitted from the semiconductor laser is scanned in a main-scan direction by a rotational polygon mirror 207, and then the scanned laser beam irradiates on a photosensitive drum 205 through a reflection mirror 208.

By the scanning irradiation of the laser beam, the electrostatic latent image is formed on the photosensitive drum 205. Then, the toner image is emerged from the latent image by using toners supplied from a development unit 220. As such the toners, yellow (Y), magenta (M), cyan (C) and black (K) toners are used. The toner image formed on the photosensitive drum 205 is then transferred onto the printing paper which is supplied synchronously in a sub-scan direction by the later-described paper feeding process mechanism.

The photosensitive drum 205 and the development unit 220 are held in a detachable cartridge 204. The reflection mirror 208 comprises a semitransparent mirror, and a beam detector 209 is provided at its rear surface side. The beam detector 209 detects the laser beam to generate a detection signal which is sent to the printer controller unit 103 held inside the control board holding unit 203. The printer controller unit 103 generates a horizontal sync signal (to be referred as BD signal hereinafter) which is used to determine exposure timing in the main-scan direction, on the basis of the detection signal from the beam detector 209. Then, the BD signal is outputted to the printer controller unit 103.

The fixing process mechanism has a fixing unit 216 for fixing the toner image transferred onto the printing paper by heat pressure. In this connection, the fixing unit 216 has a heater which heats the toner image and is controlled by an engine control unit (not shown) to obtain predetermined fixing temperature.

The paper feeding process mechanism has a cassette 210 for holding the printing papers and a manual feeding tray 219. That is, the paper feeding process mechanism is structured such that the printing paper can be selectively fed from the cassette 210 or the manual feeding tray 219. The cassette 210 is provided inside the housing 201, and a paper size detection mechanism is provided in the cassette 210 to electrically detect a size of the printing paper in accordance with a moving position of a partition plate (not shown). The uppermost one of the printing papers in the cassette 210 is carried to paper feeding rollers 212 by rotatively driving a cassette paper feeding clutch 211. The cassette paper feeding clutch 211 comprises a cam which is rotatively driven intermittently by a drive means (not shown) for each paper feeding. Therefore, every time the cam rotates one time, one sheet of the printing paper is fed.

The paper feeding rollers 212 feed the printing paper until a leading edge portion of the paper reaches a position corresponding to a resist shutter 214. Then, the resist shutter 214 stops the feeding of the printing paper and releases the feeding stop respectively by pressing the fed printing paper and releasing such the pressing. The resist shutter 214 is controlled such that the shutter operates in synchronism with the sub-scan irradiating of the laser beam. On the other hand, the manual feeding tray 219 is provided on the housing 201. The printing paper which has been placed on the manual feeding tray 219 by the user is fed toward the resist shutter 214 by a paper feeding roller 215.

The carrying process mechanism for the printing paper has carrying rollers 213 which carry the printing paper released from the pressing by the resist shutter 214 toward the photosensitive drum 205, carrying rollers 217 and 218 which introduce the printing paper discharged from the fixing unit 216 up to a discharge tray provided at an upper portion in the housing 201, and a driving means (not shown) which drives the carrying rollers 213, 217 and 218.

A console panel 202 which constructs the panel unit 104 is installed on the housing 201. Further, a switch group for an instruction inputting operation, and a light-emitting diode (LED) and a liquid crystal display (LCD) which display various information are provided on the console panel 202.

Subsequently, the internal structure of the printer controller unit 103 will be explained with reference to FIG. 13.

The printer controller unit 103 has a host interface unit 302 which internally has an input buffer for inputting the print data transmitted from the external apparatus, i.e., the host computer 101, and an output buffer for temporarily storing a signal to be transmitted to the host computer 101. The host interface unit 302 constructs an input/output unit of the signal which is managed between the printer controller unit 103 and the host computer 101, and also performs communication controlling between the unit 103 and the computer 101.

The print data which has been inputted through the host interface unit 302 is then inputted into an image data generation unit 303. The image data generation unit 303 analyzes the inputted print data on the basis of predetermined analyzing procedure (e.g., performing PDL analyzing process), and develops the print data to the image data capable of being processed by the printer engine unit (i.e., engine) 105 on the basis of such an analyzed result. Concretely, the engine 105 forms the object information by analyzing the print data, and sequentially performs a rasterizing process and the like in parallel with the forming of such an object. In the rasterizing process, displayed colors RGB (i.e., additive color mixture) included in the print data are converted into colors YMCK (i.e., subtractive color mixture) capable of being processed by the engine 105, and a pseudo-gradation process using previously-stored bit map pattern and out pattern from a character code included in the print data is performed, thereby generating the image data capable of being printing processed.

The generated image data is transferred to the engine 105 through an engine interface unit 306, as a video signal. The engine interface unit 306 internally has an output buffer for temporarily storing the video signal to be transferred to the engine 105, and an input buffer for temporarily storing a signal sent from the engine 105. The engine interface unit 306 acts as an input/output unit of the signal which is managed between the printer controller unit 103 and the engine 105, and also performs communication controlling between the unit 103 and the engine 105.

An instruction as to mode setting or the like outputted from the panel unit 104 by the user's manual inputting is transmitted to a CPU 309 through a panel interface unit 301.

The CPU 309 controls the operation of each unit in the apparatus in accordance with a mode instructed from the panel unit 104. Such controlling is executed based on a control program stored in a read-only memory (ROM) 304.

The control program stored in the ROM 304 is composed of an operating system (OS) and a plurality of load modules. This OS is used to perform time-shared controlling in unit of load module called as a task by using a system clock, and execution of the load module is controlled in unit of function on the basis of the OS. According to necessity, the control program including such the load modules is stored in an electrically erasable programmable read-only memory (EEPROM) 310 (i.e., nonvolatile memory). As a working area of the calculating process by the CPU 309, a random access memory (RAM) 307 is used.

Each unit including the above-described CPU 309 is connected to a system bus 311 to be accessible from the CPU 309. The system bus 311 is composed of an address bus and a system bus.

Subsequently, a developing process by the printer controller unit 103 for developing the print data to the image data will be explained with reference to FIG. 14.

Initially, when the print data is inputted from the host computer 101 into the printer controller unit 103 (step S401), the PDL analyzing process is performed on the inputted print data (step S402). Then, the page object information used for developing the image data is generated based on a result of the PDL analyzing process (step S403). Such the PDL analyzing process and an object information generating process are continuously performed until all the inputted print data are processed (or all the print data vanish). When all the inputted print data are processed (step S401), the process terminates. The image data obtained in the above process are sequentially outputted to the printer engine unit (i.e., engine) 105, and then printed for each page.

In this case, the printing process by the LBP belongs to a field of well-known art, whereby detailed explanation thereof is omitted. In any case, in the present embodiment, the color image is formed by superimposing the plurality of colors of plane images, the YMCK plane image data are sequentially developed in unit of page on the basis of the print data inputted from the host computer 101.

Subsequently, detailed procedure of the color displacement correcting process in the present embodiment will be explained with reference to FIGS. 15, 17A and 17B.

Initially, the printer engine unit (i.e., engine) 105 in the LBP 102 detects the amount of displacement in case of superimposing the plane images of YMCK colors (step S501). Then, the printer controller unit 103 receives from the engine 105 color displacement information (including information representing which color, the amount of displacement, the direction of displacement and the like) in a form previously determined between the engine 105 and the printer controller unit 103, as command and status (step S502). On the basis of the received color displacement information, the printer controller unit 103 converts the amount of displacement, the direction of displacement and the like into the amount of color displacement in a unit (i.e., pixel unit) necessary for the image forming (step S503).

Then, color designation for processing the YMCK plane images one by one is performed (step S504). In parallel with the above-described object information generating process, the rasterizing process is performed. In this case, before the rasterizing process is performed, it is firstly performed an engine transfer preparing process in which designation of each of the YMCK colors, designation of the amount of color displacement, designation of the direction of color displacement and other designation are performed for the engine 105. Secondly, on the basis of the generated object information, the rasterizing process for designated one of the YMCK colors is performed to generate the image data in unit of band (step S505).

When the generating of the image data of one band terminates (step S506), the correcting of the color displacement for the designated color is performed in accordance with the designated amount of color displacement (or the designated direction of color displacement) (step S507). Then, the corrected image data is transferred to the engine 105 (step S508).

After then, it is judged whether or not the transferring of the designated color of one page terminates (step S509). If not, the flow again returns to the step S505 and the processes in the steps S505 to S508 are repeated until the transferring of the designated color of one page terminates.

On the other hand, if the transferring of the designated color of one page terminates, it is further judged whether or not the data transferring for all of the four (i.e., YMCK) colors terminate (step S510). If not, the flow again returns to the step S504, and the transferring process of the designated color of one page in the steps S505 to S509 is performed for the color not yet designated. Then, if the data transferring for all the YMCK colors terminate, the flow terminates.

Hereinafter, the color displacement correcting process in the step S507 will be explained with reference to FIGS. 17A and 17B.

It is assumed that FIG. 17A shows a state where the print data (RGB) transmitted from the external apparatus such as the host computer 101 or the like have been converted into the printable image data (YMCK) by the printer controller unit 103.

In FIG. 17A, it is supposed a case in which the image data of a first pixel (i.e., upper left pixel) are data__C[0] [0]=255
data__M[0] [0]=0
data__Y[0] [0]=0
data__K[0] [0]=0 and the image data of a second pixel from the left and a first pixel from the top are data__C[2] [1]=0
data__M[2] [1]=0
data__Y[2] [1]=0 data_K[2] [1]=255

Further, if it is supposed that the unit necessary in representing the amount of color displacement is, e.g., "pixel", in a case where it is detected that the cyan (C) plane image has been displaced by −1 pixel in the main-scan direction and −2 pixels in the sub-scan direction, when the image data is transferred to the engine 105 as it is, the obtained output result includes the color displacement.

Therefore, by previously taking into consideration occurrence of the color displacement, the image data has been previously displaced. That is, by transferring to the engine 105 the image data in which the C plane image has been previously displace by 1 pixel in the main-scan direction and 2 pixels in the sub-scan direction, the correcting which has previously taken into consideration the color displacement can be performed.

Such the displaced image data can be represented as shown in FIG. 17B. In this case, it is obviously understood that the unit in representing the color displacement is not limited to "pixel", but various units such as picture element, dot and the like can be applied.

The essential image data represented in FIG. 17A as data_C[0] [0]=255
data_M[0] [0]=0
data_Y[0] [0]=0
data_K[0] [0]=0
data_C[2] [1]=0
data_M[2] [1]=0
data_Y[2] [1]=0
data_K[2] [1]=255 are subjected to the correcting process, and the image data represented in FIG. 17B as data'_C[0] [0]=0
data'_M[0] [0]=0
data'_Y[0] [0]=0
data'_K[0] [0]=0
data'_C[2] [1]=255
data'_M[2] [1]=0
data'_Y[2] [1]=0
data'_K[2] [1]=255 can be obtained.

In a case where the image data obtained after the correcting process is outputted or printed by the engine 105, such the corrected data is outputted or printed resultingly as the above-described essential image data.

According to the fourth embodiment, by taking into consideration the amount of color displacement of each color actually occurred in the engine 105, the output timing of the image data from the printer controller unit 103 has been previously changed, whereby the high-quality color image can be formed.

(Fifth Embodiment)

Figure 15:
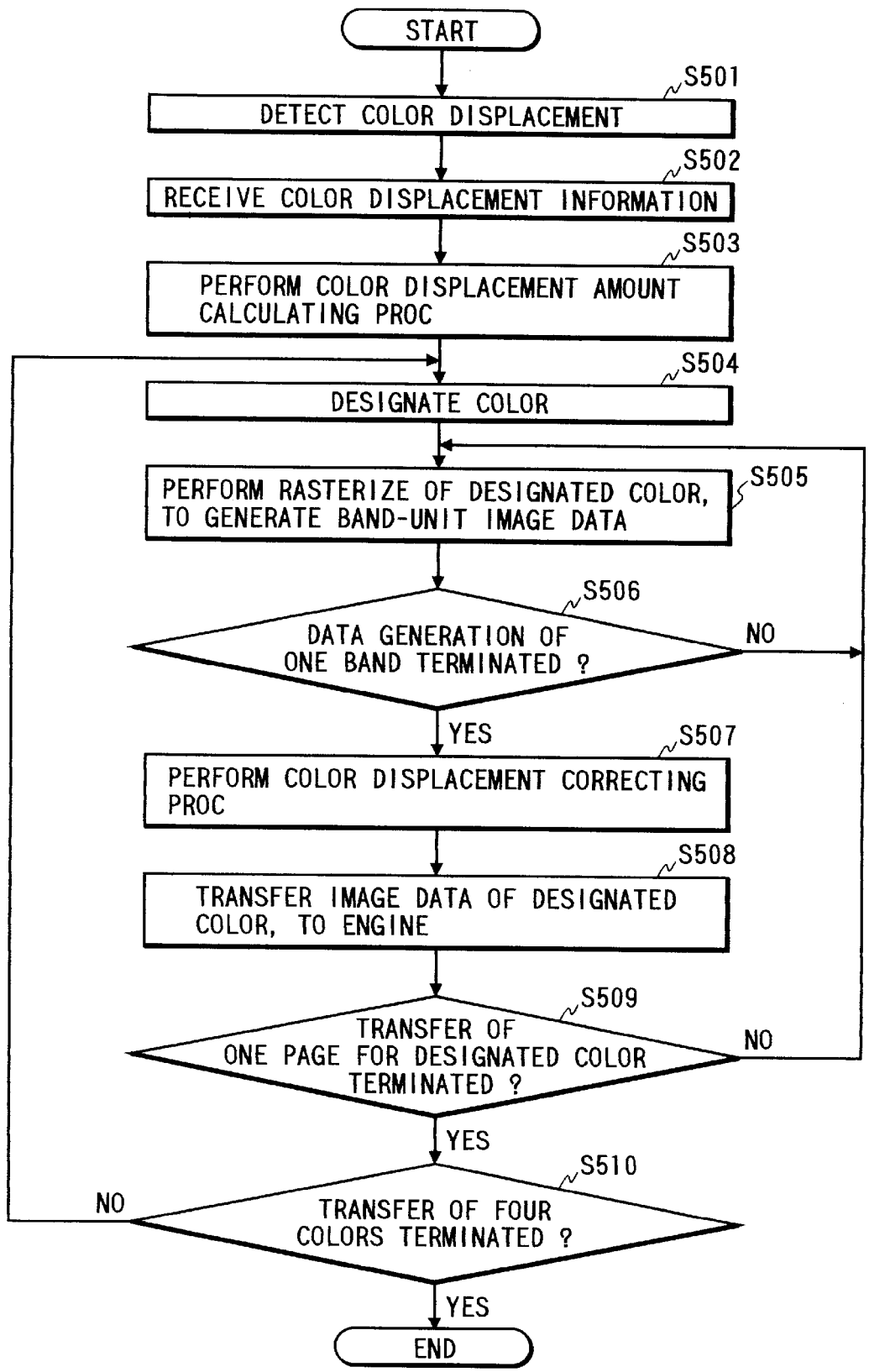
FIG. 15 is a flow chart showing a color displacement (or aberration) correcting process of a printer controller in a fourth embodiment.
Figure 16:
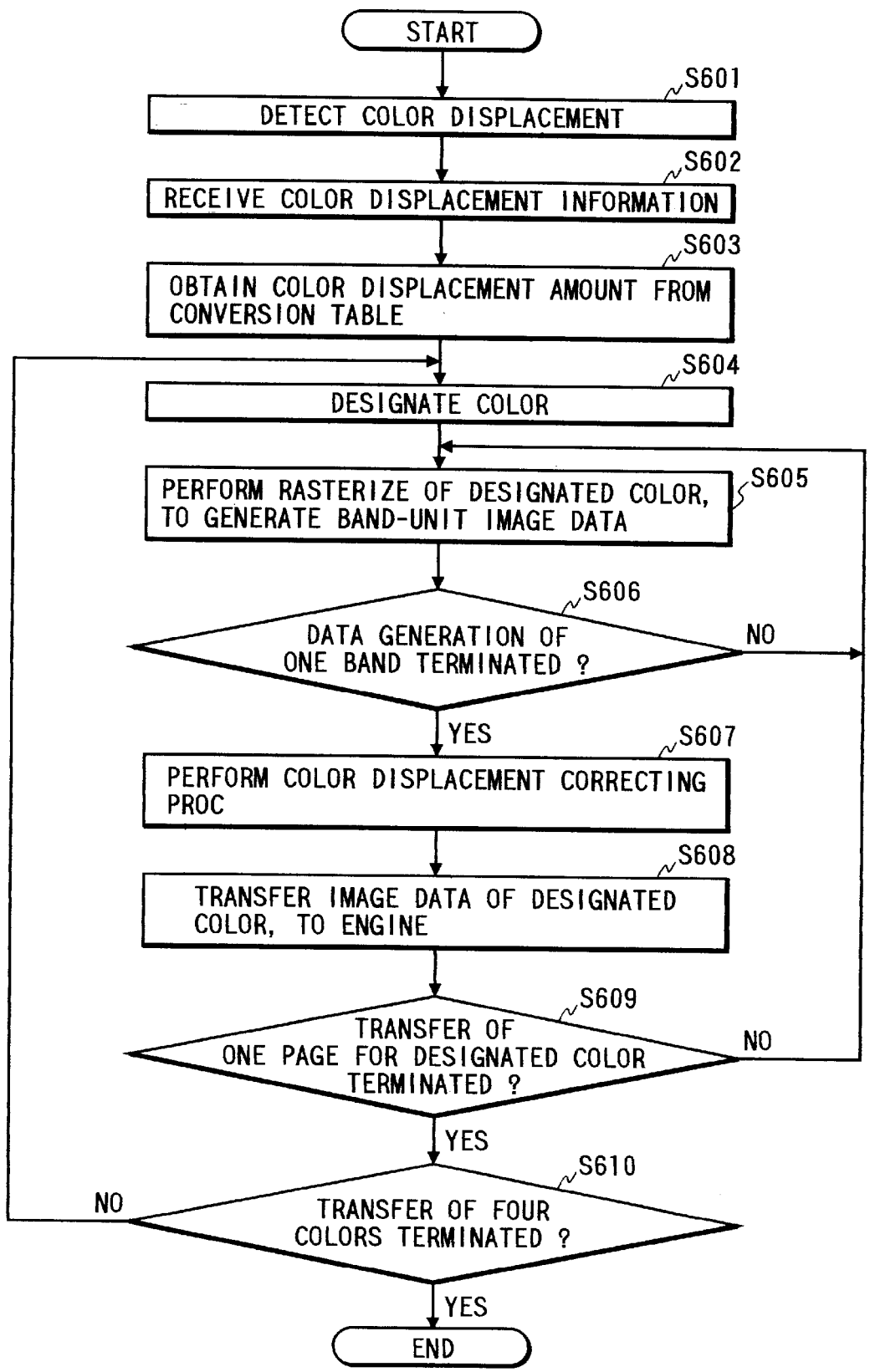
FIG. 16 is a flow chart showing a color displacement correcting process of a printer controller in a fifth embodiment.

The fifth embodiment is different from the fourth embodiment only in the way of a process in a step S603 substituted for the step S503 in FIG. 15. Hereinafter, the present embodiment will be explained with reference to FIG. 16.

Like the fourth embodiment, it is initially detected by an engine 105 in an LBP 102 that a color displacement has occurred (step S601). Then, a printer controller unit 103 receives from the engine 105 color displacement information (including information representing which color, an amount of displacement, a direction of displacement and the like) in a form previously determined between the engine 105 and the printer controller unit 103, as command and status (step S602).

In the present embodiment, since such the form has been previously determined between the printer controller unit 103 and the engine 105, it is assumed that the printer controller unit 103 has previously stored in an ROM 304 a table by which the color displacement information received from the engine 105 can be converted into necessary information with the printer controller unit 103. In the step S603, by referring to the table, the amount of displacement can be obtained at high speed from the color displacement information received in the step S602 (step S603). Processes in a step S604 and subsequent steps are the same as those in the fourth embodiment, whereby explanation thereof is omitted in the present embodiment.

As described above, in the present embodiment, a unit of the actual image displacement can be outputted at high speed from the color displacement information received by the printer controller unit 103 without any calculation.

(Sixth Embodiment)

In the above-described embodiments, the color displacement or aberration has been controlled by the printer controller unit 103. Instead, in the sixth embodiment, in order to reduce a load of processing by an LBP 102, such controlling of a color displacement is performed by a host computer 101.

In the present embodiment, a host interface unit 302 which inputs print data from the host computer 101 can selectively input not only the print data consisting of RGB colors but also the print data consisting of YMCK colors. This is the respect which is different from the fourth and fifth embodiments.

Figure 18:
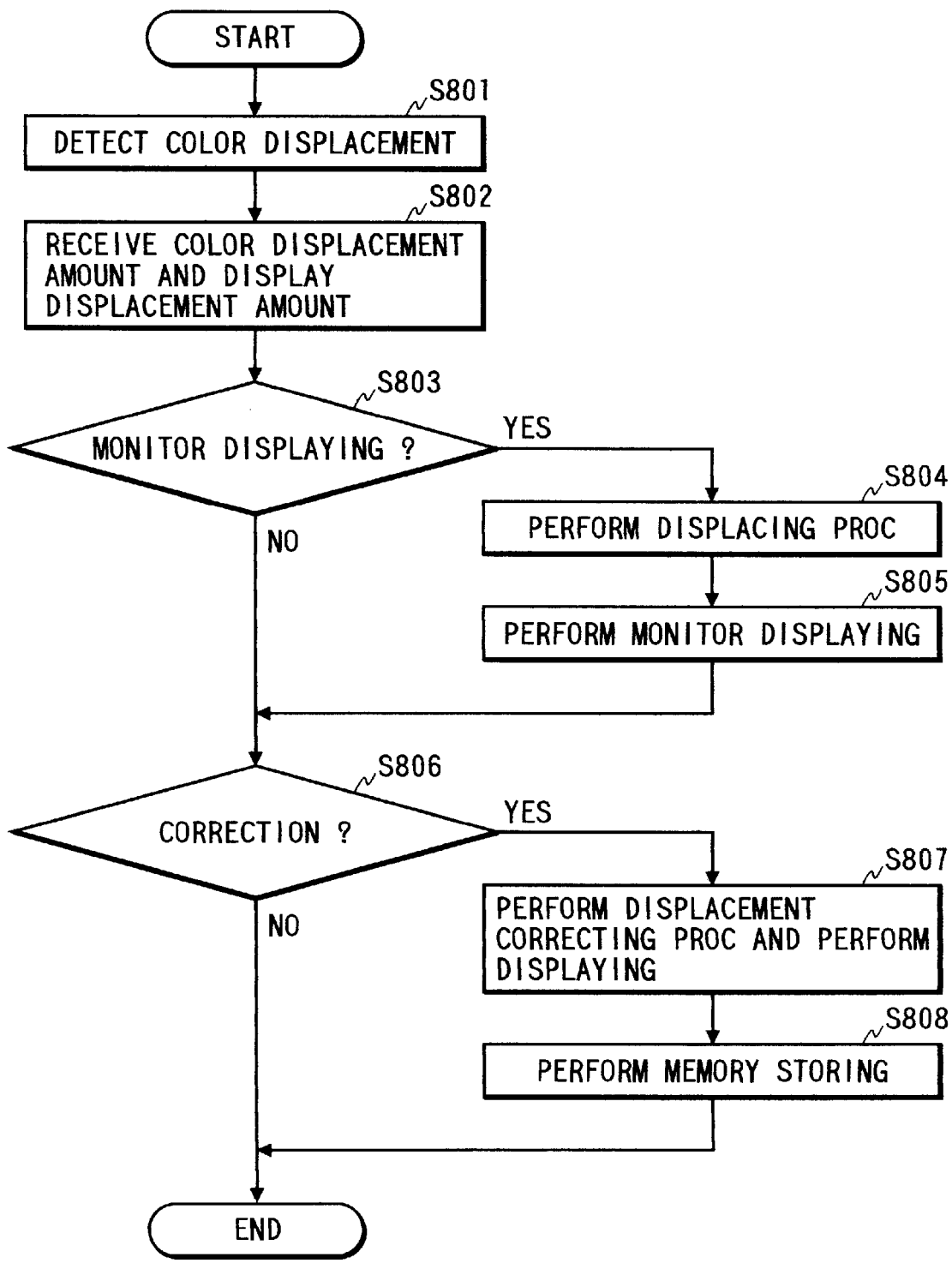
FIG. 18 is a flow chart showing a procedure of a color displacement correcting process by an external apparatus such as a host computer or the like in a sixth embodiment.

Hereinafter, it will be explained in detail a process which is performed in case of correcting the color displacement at the side of an external apparatus such as the host computer 101 or the like, with reference to FIG. 18.

In this case, a color converting process from the RGB colors into the YMCK colors by the printer controller unit 103 is not performed. Instead, a CPU provided inside the host computer 101 performs the color converting process by using a color conversion function program, whereby image data which has been already converted into the YMCK colors is transmitted for each color image plane, to the printer controller unit 103.

Like the above-described embodiments, initially, when a printer engine unit (i.e., engine) 105 detects an amount of color displacement (step S601), the engine 105 notifies a printer controller unit 103 of a fact that the color displacement has occurred.

Further, the printer controller unit 103 notifies a reception means in the external apparatus such as the host computer 101 or the like of the same fact, through the host interface unit 302.

That is, the reception means of the host computer 101 receives through the printer controller unit 103 color displacement information representing which color plane image and how many pixels the color displacement has occurred. In any case, a unit of the amount of color displacement is not limited to "pixel". Namely, it is obviously understood that other unit such as "dot" or the like can be applied.

Figures 19A, 19B:
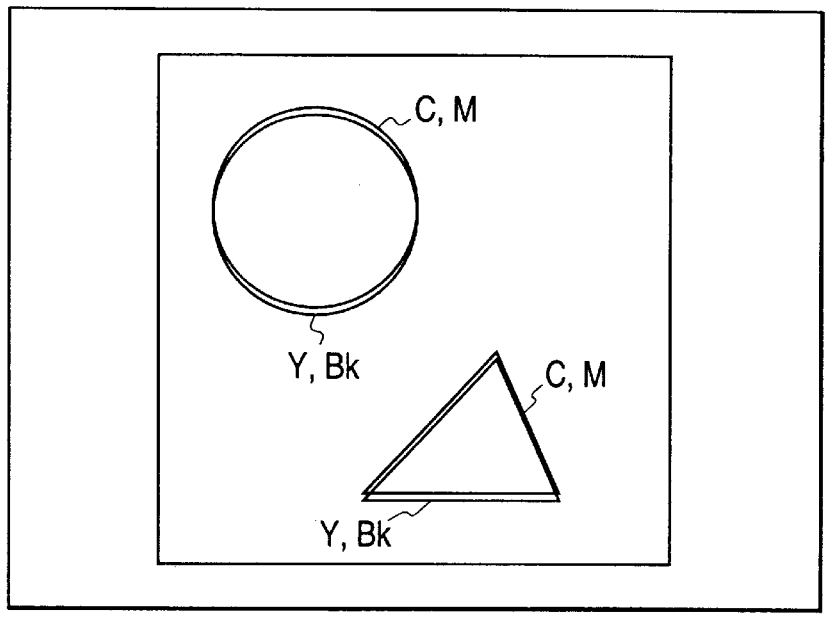
FIGS. 19A and 19B are views showing contents of displaying by a display unit of the host computer.

Further, the host computer 101 can display on its internal monitor what extent the color displacement has actually occurred. As a method for such displaying, a color image in which the color displacement has actually occurred may be displayed. Also, parameters representing, e.g., what color and how many pixels the color displacement has occurred may be displayed (step S802). Examples of such the displaying are shown in FIGS. 19A and 19B. In FIG. 19A, a state of the color image in which the color displacement has actually occurred is displayed as formed images, and in FIG. 19B, the amounts of displacement are displayed as the parameters.

In a step S803, in accordance with previous instructions as to whether or not such a function is to be used, it is judged whether or not the state of the color image is to be displayed on the monitor in the case where the color displacement occurred (i.e., in the case where the color displacement correcting is not performed). Subsequently, in a step S805, the engine 105 performs the monitor displaying such that a current state of the color displacement can be understood at a glance. In this case, the monitor-displayed color image is controlled such that each color plane image is displayed with the displacement by the same direction and amount as those in the actual color displacement of each plane image (step S804).

In a step S806, it is selected or checked whether or not the color displacement correcting process is to be performed for such the state of color displacement displayed on the monitor. In the present embodiment, such selection in the step S806 is manually performed by an operator through an internal console unit in the case where the monitor displaying was performed in the step S805. On the other hand, in the case where the monitor displaying was not performed in the step S805, the color displacement correcting process is automatically performed. However, the present invention is not restricted to such an operation. That is, the correcting process may be automatically or manually selected in any case.

In the case where the color displacement correcting process was selected in the step S806, such the process is performed on the basis of the color displacement information received by the host computer 101 (step S807).

Then, a state of color displacement after the correcting process is displayed on the monitor (step S807). By such a process, the state of the color image which has been outputted or printed after correcting the color displacement can be observed.

The print data for each of the YMCK colors to which the color displacement correcting process (i.e., for displacing a position of the image) has been performed is stored in a memory provided inside the host computer 101, a hard disk connected to the memory, or the like (step S808). Then, such the print data to which the color displacement correcting process has been performed is sent to the LBP 102.

As described above, different from the fourth and fifth embodiments, the color displacement correcting process has been previously performed in the external apparatus such as the host computer 101 or the like in the present embodiment, whereby the load on the printer can be reduced.

In the present embodiment, a hardware in the host computer may perform the above-described color displacement correcting process. Also, software (an OS or printer driver) initiated by the host computer may perform such the color displacement correcting process.

As described above, according to the present embodiment, although the load in the process of a printing apparatus such as the LBP or the like can be reduced as much as possible, the color displacement in case of forming the color image can be corrected.

In the above-described embodiments, the color displacement is corrected by displacing the position of the image for each of the YMCK colors in the print data of each of the YMCK colors to be transmitted from the host computer 101 or the printer controller unit 103 (i.e., by changing the image data itself). However, the present invention is not restricted to such the operation.

That is, in the above-described embodiments, the output timing of the print data of each of the YMCK colors from the printer controller unit 103 to the engine 105 may be controlled.

Further, in the present embodiment, in the case where the print data is independently transmitted for each of the YMCK colors from the host computer 101 to the printing apparatus such as the LBP or the like, like the above-described embodiments, the host computer 101 simply controls the timing for outputting the print data of each color (YMCK) to the printing apparatus on the basis of the received color displacement information. Then, the printing apparatus which has sequentially received the print data of each color performs the printing or outputting of the print data on the basis of the reception timing corresponding to each color, whereby the color displacement can be corrected. In such operation, although the load involved in the processing of the printing apparatus such as the LBP or the like is reduced as much as possible, the color displacement in case of forming the color image can be corrected. Especially, if the data communicating between the host computer 101 and the printing apparatus can be performed at extremely high speed, such the operation can be easily realized.

In the first to sixth embodiments of the present invention, the color displacement information is generated for each color. However, the present invention is not restricted to those embodiments. That is, the engine 105 may detect the relative positional displacement of each color and thus may send the color displacement information to the host computer through the printer controller unit. For example, the engine 105 may detect the positional displacement between the first color (Y) and the remaining three colors (MCK). By such an operation, the number of the necessary color displacement information may be reduced.

As described above, according to the present invention, in the case where the image process apparatus superimposes the plane images of the plurality of components transmitted from the electronic apparatus such as the host computer or the like, the correcting process is performed in accordance with the amount of color displacement. Therefore, the high-quality color image can be formed without any color displacement. Especially, by performing such correcting process at the side of the external electronic apparatus, the load involved in the processing of such image process apparatus (e.g., LBP) is reduced as much as possible, whereby the processing cost can be reduced.

Further, by providing the electronic apparatus which displays on its monitor the extent of color displacement in such image process apparatus, the extent of color displacement occurred in the image process apparatus, i.e., the external apparatus, can be easily understood. Therefore, the operator at the side of the electronic apparatus can cope with such color displacement, as s/he observes the displayed contents.

Although the present invention has been described above with respect to the preferred embodiments, the present invention is not restricted to the above-described embodiments but many modifications and variations are possible with the spirit and scope of the appended claims.

What is claimed is:

1. An electronic apparatus comprising:
   transmission means for transmitting, to an external apparatus which visibly outputs a color image by superimposing a plurality of colors of plane images, image data corresponding to the plurality of colors of plane images;
   reception means for receiving information representing an extent of a positional displacement which has occurred in a case of superimposing the plurality of colors of plane images in the external apparatus; and control means for controlling timing of the transmitting of the image data corresponding to the plurality of colors of plane images by said transmission means, on the basis of the information received by said reception means.

2. An apparatus according to claim 1, wherein said electronic apparatus includes a host computer.

3. An apparatus according to claim 1, further comprising display means for displaying an image based on the information received by said reception means.

4. An apparatus according to claim 1, further comprising display means for displaying the extent of the positional displacement, on the basis of the information received by said reception means.

5. An apparatus according to claim 4, wherein said display means displays a parameter based on the information received by said reception means.

6. An apparatus according to claim 4, wherein said display means displays a color image based on the information received by said reception means.

7. An image processing method for use in an electronic apparatus comprising:

a transmission step of transmitting, to an external apparatus which visibly outputs a color image by superimposing a plurality of colors of plane images, image data corresponding to the plurality of colors of plane images;

a reception step of receiving information representing an extent of a positional displacement which has occurred in a case of superimposing the plurality of colors of plane images in the external apparatus; and a control step of controlling timing of the transmitting of the image data corresponding to the plurality of colors of plane images in said transmission step, on the basis of the information received in said reception step.

8. An electronic apparatus comprising:

transmission means for transmitting, to an external apparatus which visibly outputs a color image by superimposing a plurality of colors of plane images, image data representing the plurality of colors of plane images;

reception means for receiving information representing an extent of a positional displacement which has occurred in a case of superimposing the plurality of colors of plane images in the external apparatus; and edit means for editing the image data such that relative positions of the plurality of colors of plane images represented by the image data transmitted by said transmission means differ from others, on the basis of the information received by said reception means.

9. An apparatus according to claim 8, wherein said electronic apparatus includes a host computer.

10. An apparatus according to claim 8, further comprising display means for displaying an image based on the information received by said reception means.

11. An apparatus according to claim 8, further comprising display means for displaying the extent of the positional displacement, on the basis of the information received by said reception means.

12. An apparatus according to claim 11, wherein said display means displays a parameter based on the information received by said reception means.

13. An apparatus according to claim 11, wherein said display means displays a color image based on the information received by said reception means.

14. An image processing method for use in an electronic apparatus comprising:

a transmission step of transmitting, to an external apparatus which visibly outputs a color image by superimposing a plurality of colors of plane images, image data representing the plurality of colors of plane images;

a reception step of receiving information representing an extent of a positional displacement which has occurred in a case of superimposing the plurality of colors of plane images in the external apparatus; and an edit step of editing the image data such that relative positions of the plurality of colors of plane images represented by the image data transmitted in said transmission step differ from others, on the basis of the information received in said reception step.

15. An image processing apparatus which receives image data representing a plurality of colors of plane images from an external apparatus, and causes a predetermined image formation unit to form a color image by superimposing the plurality of colors of plane images represented by the image data, said image processing apparatus comprising:

reception means for receiving information representing an extent of a positional displacement which has occurred in a case of superimposing the plurality of colors of plane images in the image formation unit, from the image formation unit; and transmission means for transmitting the information received by said reception means, to the external apparatus.

16. An apparatus according to claim 15, wherein said image processing apparatus includes a printer controller.

17. An image processing method in which image data representing a plurality of colors of plane images is received from an external apparatus, and a predetermined image formation unit is caused to form a color image by superimposing the plurality of colors of plane images represented by the image data, said image processing method comprising:

a reception step of receiving information representing an extent of a positional displacement which has occurred in a case of superimposing the plurality of colors of plane images in the image formation unit, from the image formation unit; and a transmission step of transmitting the information received in said reception step, to the external apparatus.

* * * * *

UNITED STATES PATENT AND TRADEMARK OFFICE
CERTIFICATE OF CORRECTION

PATENT NO.   :   6,021,258
DATED        :   February 1, 2000
INVENTOR(S)  :   MASANORI ISHIZU ET AL.

It is certified that error appears in the above-identified patent and that said Letters Patent is hereby corrected as shown below:

COLUMN 1:

Line 43, "referred" should read --referred to--;
    Line 45, "referred" should read --referred to--;
    Line 46, "referred" (both instances) should read --referred to--; and
    Line 47, "referred" should read --referred to--.

COLUMN 2:

Line 30, "a" should read --over a--;
    Line 38, "the" should read --a--;
    Line 41, "at" should read --at a--;
    Line 48, "these" should read --this--; and
    Line 57, "the high-quality" should read --a high-quality--.

COLUMN 4:

Line 36, "referred" should read --referred to--; and
    Line 64, "which" should be deleted.

COLUMN 5:

Line 6, "which" should be deleted.

COLUMN 6:

Line 26, "to" should read --to the--.

UNITED STATES PATENT AND TRADEMARK OFFICE
CERTIFICATE OF CORRECTION

PATENT NO.    : 6,021,258

DATED         : February 1, 2000

INVENTOR(S)   : MASANORI ISHIZU ET AL.

It is certified that error appears in the above-identified patent and that said Letters Patent is hereby corrected as shown below:

COLUMN 7:

Line 7, "the" should read --a--;
    Line 38, "the" should read --a--; and
    Line 41, "what" should read --to what--.

COLUMN 9:

Line 25, "referred" should read --referred to--.

COLUMN 10:

Line 35, "the" should be deleted.

COLUMN 11:

Line 3, "vide" should read --video--.

COLUMN 12:

Line 8, "such the" should read --such--;
    Line 13, "the system" should read --system--;
    Line 42, "are" should read --is--;
    Line 53, "above" should read --above-described--;
    Line 55, "such the" should read --such a--; and
    Line 59, "an" should be deleted.

COLUMN 13:

Line 13, "the various devices-are" should read --various device--; and
    Line 22, "construct" should read --constructs--.

UNITED STATES PATENT AND TRADEMARK OFFICE
CERTIFICATE OF CORRECTION

PATENT NO. : 6,021,258

DATED : February 1, 2000

INVENTOR(S) : MASANORI ISHIZU ET AL.

It is certified that error appears in the above-identified patent and that said Letters Patent is hereby corrected as shown below:

COLUMN 14:

Line 8, "side" should be deleted;
    Line 38, "be derived" should read --derive--;
    Line 42, "the" should read --a--;
    Line 46, "the" should read --a--;
    Line 51, "referred" should read --referred to--;
    Line 59, "referred" should read --referred to--; and
    Line 62, "referred" should read --referred to--.

COLUMN 15:

Line 48, "the" should be deleted; and
    Line 62, "referred" should read --referred to--.

COLUMN 16:

Line 26, "the" should be deleted.

COLUMN 17:

Line 7, "out" should read --output--; and
    Line 33, "the" should be deleted.

COLUMN 18:

Line 57, "are" should read --are:--; and
    Line 63, "are" should read --are:--.

UNITED STATES PATENT AND TRADEMARK OFFICE
CERTIFICATE OF CORRECTION

PATENT NO.   :   6,021,258

DATED        :   February 1, 2000

INVENTOR(S)  :   MASANORI ISHIZU ET AL.                 Page 4 of 5

It is certified that error appears in the above-identified patent and that said Letters Patent is hereby corrected as shown below:

COLUMN 19:

Line 4, ""pixel"," should read --a "pixel,"--;
    Line 13, "displace" should read --displaced--;
    Line 20, "picture" should read --a picture--;
    Line 21, "dot" should read --a dot--;
    Line 46, "the corrected" should read --corrected--; and
    Line 56, "in the way of a process in a"
        should read --in that-- and
        "substituted" should read --is substituted--.

COLUMN 20:

Line 1, "such the" should read --such--;
    Line 61, "what" should read --to what--;
    Line 65, "has" should read --have--; and
    Line 66, "the" should be deleted.

COLUMN 21:

Line 19, "such the" should read --such a--;
    Line 31, "such the" should read --such--;
    Line 44, "the print" should read --print--;
    Line 51, "a" should be deleted;
    Line 54, "such the" should read --such--; and
    Line 67, "the" should be deleted.

UNITED STATES PATENT AND TRADEMARK OFFICE
CERTIFICATE OF CORRECTION

PATENT NO. : 6,021,258
DATED : February 1, 2000
INVENTOR(S) : MASANORI ISHIZU ET AL.

It is certified that error appears in the above-identified patent and that said Letters Patent is hereby corrected as shown below:

COLUMN 22:

Line 22, "the" should be deleted.

Signed and Sealed this

Twentieth Day of March, 2001

Attest:

NICHOLAS P. GODICI

Attesting Officer

Acting Director of the United States Patent and Trademark Office